(12) United States Patent
Shugayev et al.

(10) Patent No.: US 12,455,268 B2
(45) Date of Patent: Oct. 28, 2025

(54) PLASMONIC MICROWAVE METAMATERIAL WAVEGUIDE SENSING

(71) Applicant: United States Department of Energy, Washington, DC (US)

(72) Inventors: Roman Shugayev, Albuquerque, NM (US); Jagannath Devkota, Pittsburgh, PA (US); Paul R. Ohodnicki, Jr., Pittsburgh, PA (US)

(73) Assignee: United States Department of Energy, Washington, DC (US)

( * ) Notice: Subject to any disclaimer, the term of this patent is extended or adjusted under 35 U.S.C. 154(b) by 463 days.

(21) Appl. No.: 18/101,702

(22) Filed: Jan. 26, 2023

(65) Prior Publication Data

US 2023/0243760 A1    Aug. 3, 2023

Related U.S. Application Data

(60) Provisional application No. 63/304,873, filed on Jan. 31, 2022.

(51) Int. Cl.
*G01N 33/00* (2006.01)
*G01N 22/00* (2006.01)

(52) U.S. Cl.
CPC ....... *G01N 33/0027* (2013.01); *G01N 33/004* (2013.01); *G01N 22/00* (2013.01)

(58) Field of Classification Search
CPC ... G01N 33/0027; G01N 33/004; G01N 22/00
See application file for complete search history.

(56) References Cited

U.S. PATENT DOCUMENTS

| 8,208,191 B2 | 6/2012 | Gan et al. |
| 9,878,516 B2 | 1/2018 | Glembocki et al. |

(Continued)

FOREIGN PATENT DOCUMENTS

CN    101762566 B    6/2010

OTHER PUBLICATIONS

Podunavac, I.; Radonic, V.;Bengin, V.; Jankovic, N. Microwave Spoof Surface Plasmon Polariton-Based Sensor for Ultrasensitive Detection of Liquid Analyte Dielectric Constant. Sensors 2021, 21, 5477. https://doi.org/ 10.3390/s21165477.*

(Continued)

*Primary Examiner* — Nathaniel J Kolb

(74) *Attorney, Agent, or Firm* — Aaron R. Keith; Michael J. Dobbs

(57) ABSTRACT

A method to detect the presence and or concentration of an analyte in the environment of a spoof plasmon sensor having the steps of: providing a spoof plasmon sensor into an environment; interrogating said spoof plasmon sensor with an electromagnetic signal; collecting a modified electromagnetic signal from the spoof plasmon sensor; and analyzing the modified electromagnetic signal to detect an analyte in the environment of the sensor. A spoof plasmon sensor for detecting an analyte having a substrate with a superior surface; and a conductive material disposed on said superior surface, said conductive material defining a waveguide having a dual tapering shape, wherein said waveguide defines spoof plasmon cavities which are exposed substrate, where said substrate is configured to change in permittivity when contacted by an analyte.

12 Claims, 24 Drawing Sheets

(56) References Cited

U.S. PATENT DOCUMENTS

| | | | | |
|---|---|---|---|---|
| 2015/0118124 A1* | 4/2015 | Khorasaninejad | ..... | B82Y 15/00 |
| | | | | 422/429 |
| 2023/0107066 A1* | 4/2023 | Ram | ................ | G01N 33/497 |
| | | | | 435/4 |

OTHER PUBLICATIONS

Rong Lin Shao et al., Quarter-mode spoof plasmonic resonator for a microfluidic chemical sensor, Applied Optics, vol. 57, Issue 28, pp. 8472-8477 (2018).*

Chen et al. "Ultrasensitive terahertz metamaterial sensor based on spoof surface plasmon" Scientific Reports | 7: 2092 | DOI: 10.1038/s41598-017-01781-6.*

Ng Binghao et al, Broadband Terahertz Sensing on Spoof Plasmon Surfaces, ACS Photonics 2014, 1, 10, 1059-1067.

Liangliang Liu et al., Dual-band trapping of spoof surface plasmon polaritons and negative group velocity realization through microstrip line with gradient holes, Appl. Phys. Lett. 107, 201602 (2015).

Xiaopeng Shen et al., Ultrathin plasmonic metamaterial for spoof localized surface plasmons, Laser Photonics Rev. 8, No. 1, 137-145 (2014).

Xu Chen et al., Ultrasensitive terahertz metamaterial sensor based on spoof surface plasmon, Scientific Reports vol. 7, Article No. 2092 (2017).

Jinjing Yang et al., Broadband molecular sensing with a tapered spoof plasmon waveguide, Opt. Express 23, 8583-8589 (2015).

Alexadre G. Brolo et al., Surface Plasmon Sensor Based on the Enhanced Light Transmission through Arrays of Nanoholes in Gold Films, Langmuir 2004, 20, 12, 4813-4815.

Xiaopeng Shen et al., Conformal surface plasmons propagating on ultrathin and flexible films, Proceedings of the National Academy of Sciences, vol. 110, No. 1, Jan. 2, 2013.

Danni Wang et al., Spoof Localized Surface Plasmons Excited by Plasmonic Waveguide Chip with Corrugated Disk Resonator, Plasmonics 12 (2017): 947-952.

Bao Jia Yang et al., Spoof localized surface plasmons in corrugated ring structures excited by microstrip line, Optics Express, vol. 23, Issue 16, pp. 21434-21442 (2015).

* cited by examiner

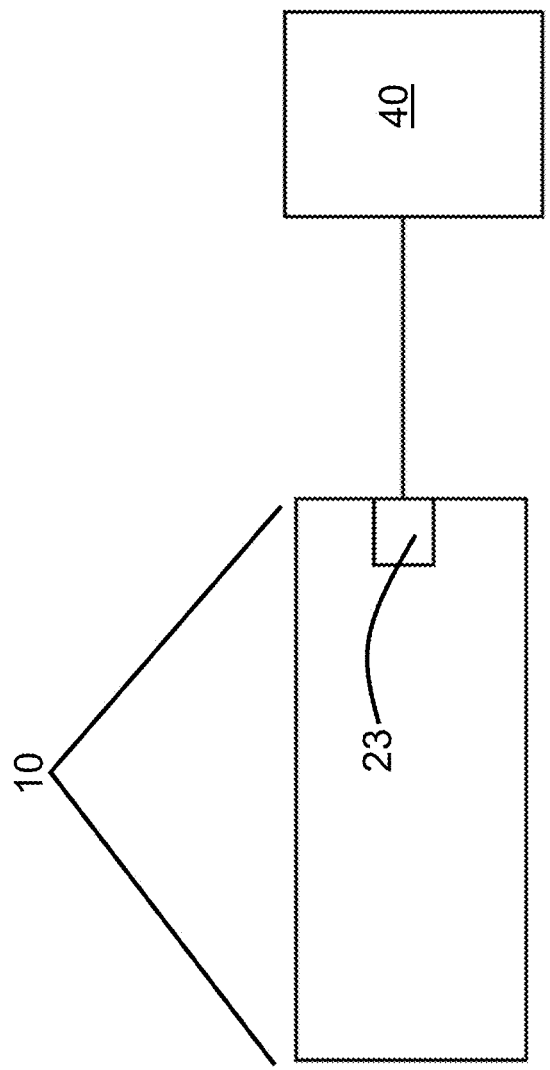

PLASMONIC MICROWAVE METAMATERIAL WAVEGUIDE SENSING

CROSS REFERENCE TO RELATED APPLICATIONS

This Utility Patent Application claims priority benefit as a U.S. Non-Provisional of U.S. Provisional Patent Application Ser. No. 63/304,873, filed on Jan. 31, 2022, currently pending, the entirety of which is incorporated by reference herein.

GOVERNMENT INTERESTS

This invention was made with United States Government support under the Department of Energy Number DE-FE0004000. The United States Government has certain rights in this invention.

FIELD OF THE INVENTION

Exemplary embodiments relate to a spoof plasmonic sensor and methods of using said spoof plasmonic sensor. More specifically, embodiments relate to a plasmonic waveguide sensor suitable for interrogation with microwaves to detect the presence and concentration of an analyte and methods of using said waveguide sensor to detect the presence and concentration of an analyte.

BACKGROUND OF THE INVENTION

Plasmonics have become an indispensable tool for sensing in the optical range with new and emerging applications based upon local plasmon and surface plasmon polaritons steady growth. The surface plasmon phenomena is directly linked to a resonance between positive and negative permittivity values at dielectric/metal interfaces. Therefore, in the pure form the plasmon phenomena is confined to metals such as Ag, Au, and conducting metal oxides in the visible and infrared region of the spectrum. Surface grating phenomena has extended the application of plasmonic sensing to lower frequency ranges in the microwave electromagnetic frequency range, by corrugating planar metal surfaces with periodic grooves having spacings directly related to the frequency range of interest. More precisely plasmonic cutoff frequency and operating range decreases with the increasing period of the grooves. And, therefore, the period of groove spacings dictate the final dimension of low frequency devices. Devices compatible with frequencies as low as a few tens of MHz are practical even though there are no theoretical bounds to usable frequency range. Additionally, periodic grooves, in effect, create a planar metamaterial surface whose properties are determined by effective permittivity and permeability parameters.

For nearly perfect metals the periodic grooves are not required to be semi-infinite in the transverse direction but instead can have a thickness approaching zero which enables practical device miniaturization. As a result of this realization, a range of practical planar spoof plasmon devices have emerged only very recently. In such devices, electric fields have increased localization in the substrate region which serves to improve sensing response to substrate permittivity changes. Similarly, the highly localized electromagnetic field can also be used to monitor dielectric constant of the spoof plasmon device surroundings. Apart from field localization and a small device form factor, discontinuity in dispersion relation creates conditions for enhanced sensing via plasmon resonance frequency shift and slow wave phenomena. The planar nature of these devices permits easy integration with external planar antennas for remote access and the large characteristic dimensions (~1 cm) as compared to photonic plasmonic devices (~100 nm) results in low-cost flexible fabrication procedures.

Sensing is extremely important for research, industrial, government, and civil applications. Of particular interest are the lifesaving sensing applications that identify the presence of chemical biohazards, airborne biohazards, asphyxiating agents, and toxic agents. Greenhouse gas environmental monitoring, gas transportation, food, and manufacturing industries as well as emerging $CO_2$ capture and sequestration technologies require fast and accurate gas detection capabilities. Additional applications include infrastructure monitoring such as local health monitoring of important infrastructures which may include roads, bridges, pipelines, electrical transmission and distribution lines, and power generation (nuclear, fossil, etc.) as well as electric power conversion (transformers, etc.) assets.

Several methods for gas sensing, including electrochemical, solid state, optical, and surface acoustic wave sensors, have been investigated in the past several decades. With ongoing progress of automation and wireless technology, criteria for distributed access and addressability of the sensor via remote means becomes increasingly important. This trend creates a demand for sensors that are passive and yet can be integrated with emergent wireless technologies and networking architectures such as Internet of Things and 5G. For wireless sensing in these applications, it is critical to be able to scale passive device operation to a higher (~5-100 GHz) frequency range than would be traditionally accessible with existing passive wireless sensor technology (~100 MHz-3 GHz) due in part to the challenges associated with fabrication exceptionally small device features at high frequency.

Relatively small permittivity changes associated with external factors have proven to be an extremely useful sensing parameter and can pinpoint physical, environmental and physiological activity. For example, monitoring of small permittivity changes has been utilized in the context of a cancer biomarker. In the past several years metamaterials have emerged as a new sensing technology that takes advantage of designer materials with tailored properties and novel physics to augment and enhance sensing responses to local permittivity changes. Several sensors in THz, radio frequency (RF) and microwave (MW) range inspired by metamaterial structures have been demonstrated. Despite this, very small ($\Delta\varepsilon \approx 0.01$-$0.1\%$) permittivity change sensing applications such as gas and fluid sensing of energy infrastructure remains a challenge due to weak dependence of permittivity on phase composition. Therefore, there is a need for new plasmonic sensors that can operate in the electromagnetic frequency range with improved sensitivity due to the enhanced interaction with the analyte of interest as well as ease of device manufacturing and compatibility with low-cost production methods.

SUMMARY

According to one embodiment of the present invention, an amplified plasmonic sensor comprising a waveguide defining a plurality of spoof plasmon cavities, wherein said spoof plasmon cavities comprise a substrate configured to experience a change in permittivity when contacted by an analyte.

Another embodiment of the invention provides for a method of determining the presence and or concentration of an analyte in the environment surrounding a spoof plasmon sensor.

Briefly, the invention provides a method to detect the presence and or concentration of an analyte in the environment of a spoof plasmon sensor comprising: providing a spoof plasmon sensor into an environment; interrogating said spoof plasmon sensor with an electromagnetic signal; collecting a modified electromagnetic signal from the spoof plasmon sensor; and analyzing the modified electromagnetic signal to detect an analyte in the environment of the sensor.

The invention also provides a spoof plasmon sensor for detecting an analyte comprising: a substrate with a superior surface; and a conductive material disposed on said superior surface, said conductive material defining a waveguide having a dual or single tapering shape, wherein said waveguide defines spoof plasmon cavities comprising exposed substrate, wherein said substrate is configured to change in permittivity when contacted by an analyte.

BRIEF DESCRIPTION OF THE DRAWINGS

Embodiments of the present invention are illustrated in the accompanying figures where:

FIG. 2A shows a wired sensing setup to detect an analyte with a spoof plasmon sensor, in accordance with the features of the present invention;

DETAILED DESCRIPTION OF THE INVENTION

The following detailed description provides illustrations for embodiments of the present invention. Each example is provided by way of explanation of the present invention, not in limitation of the present invention. Those skilled in the art will recognize that other embodiments for carrying out or practicing the present invention are also possible. Therefore, it is intended that the present invention covers such modifications and variations as come within the scope of the appended claims and their equivalents.

Sensor Detail

Figure 1A:
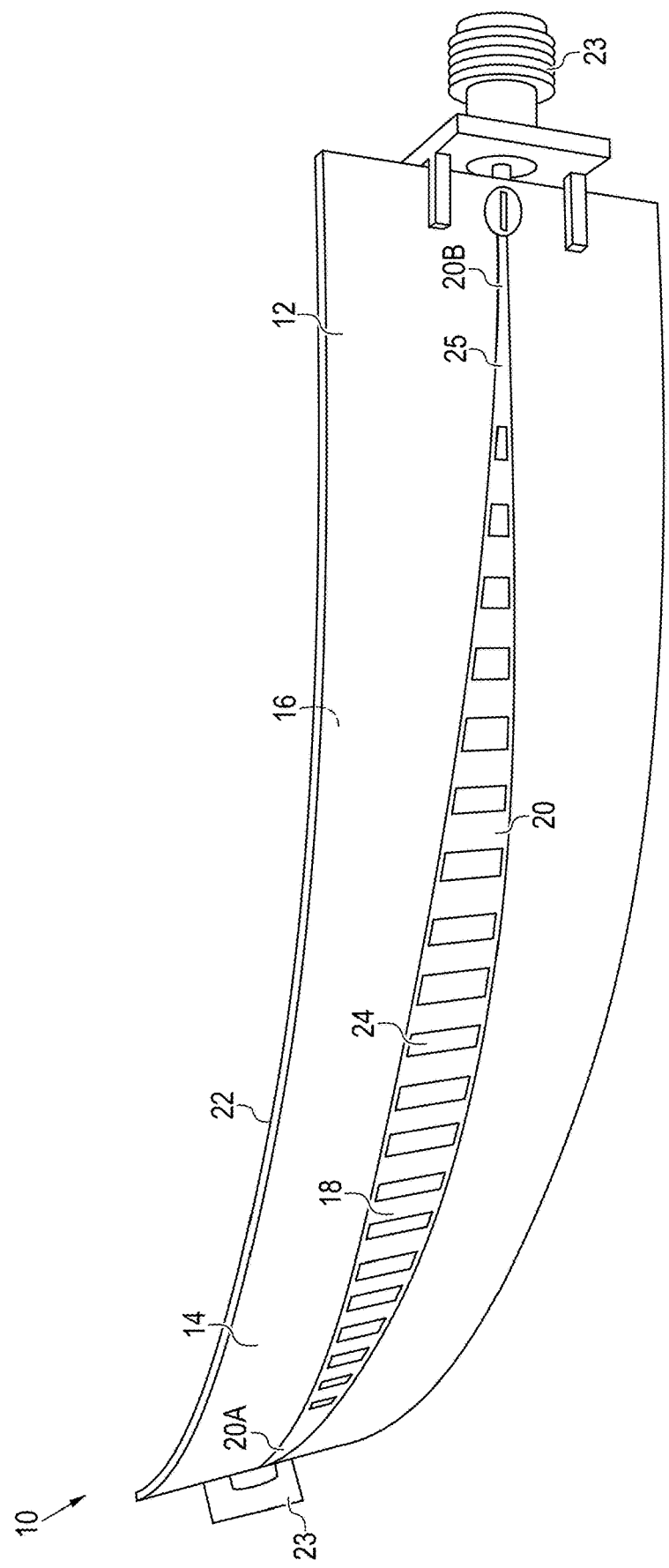
FIG. 1A depicts an embodiment of a spoof plasmon sensor, in accordance with the features of the present invention.

Referring to FIG. 1A, an embodiment of an amplified plasmonic sensor 10 is shown. As shown in FIG. 1A, the sensor 10 comprises a substrate 12 having a superior surface 14 and a depending surface 16 (shown in FIG. 1C). A conductive material 18 is disposed on the superior surface 14 of the substrate, wherein said conductive material 18 defines a surface spoof plasmon planar waveguide 20 on the superior surface 14 of the substrate. Said waveguide 20 has and extends between first and second ends 20A, 20B along a longitudinal axis α (shown in FIG. 1B) of the waveguide. In an embodiment, a grounding layer 22 is in contact with the depending surface 16 of the substrate such that the substrate 10 is sandwiched between said conductive material 18 and said grounding layer 22 as shown in FIG. 1C. As shown in FIG. 1A, a connector 23 is positioned at each end of the waveguide. Said connectors 23 contact said conductive material 18 and grounding layer 22 such that the conductive material 18 and grounding layer 22 are in electromagnetic communication.

A person having ordinary skill in the art will readily understand that the grounding layer 22 is an optional feature. In an embodiment, the invented sensor setup does not include a grounding layer.

Figure 1B:
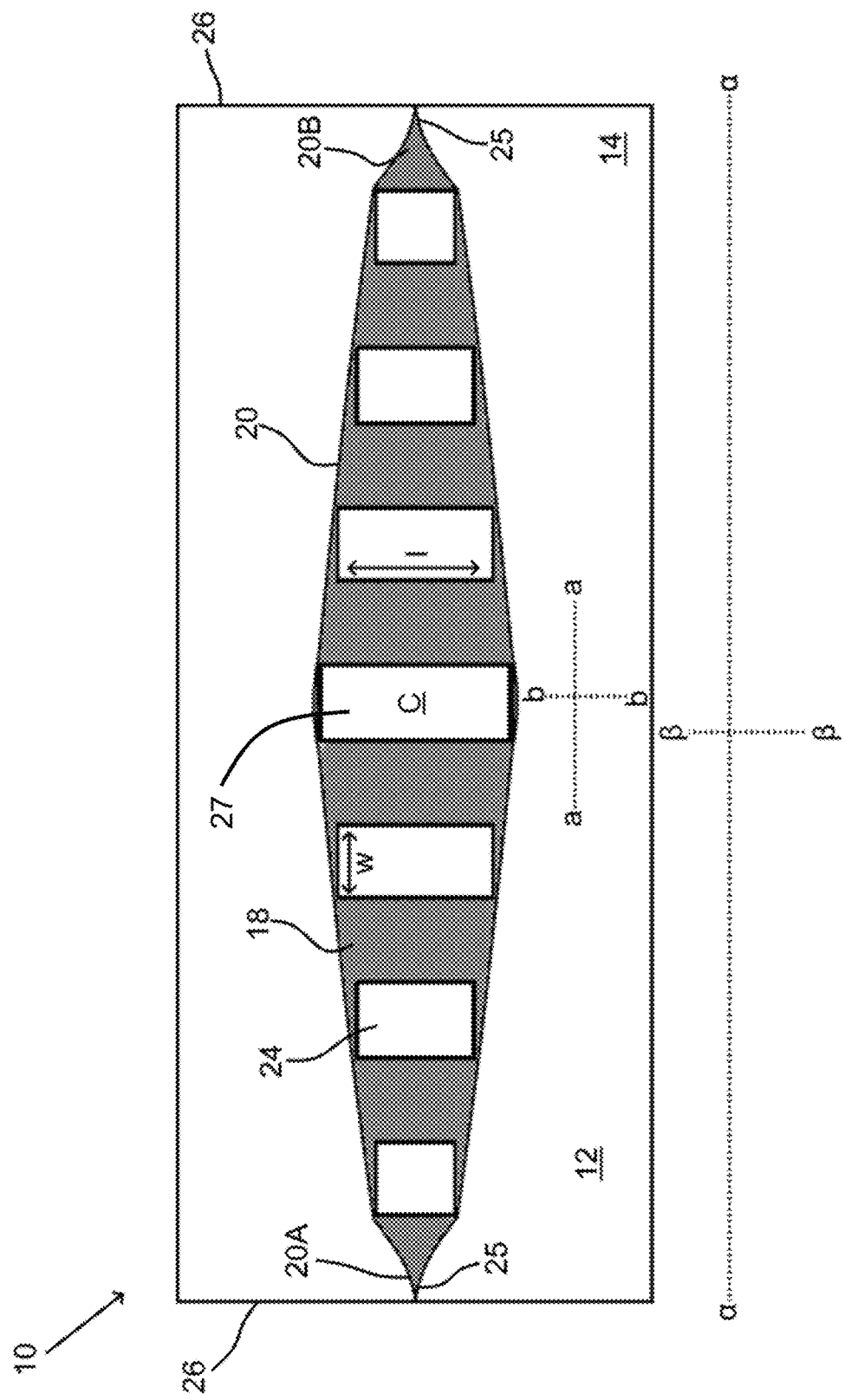
FIG. 1B is a simplified view of a spoof plasmon sensor, in accordance with the features of the present invention.
Figure 1C:
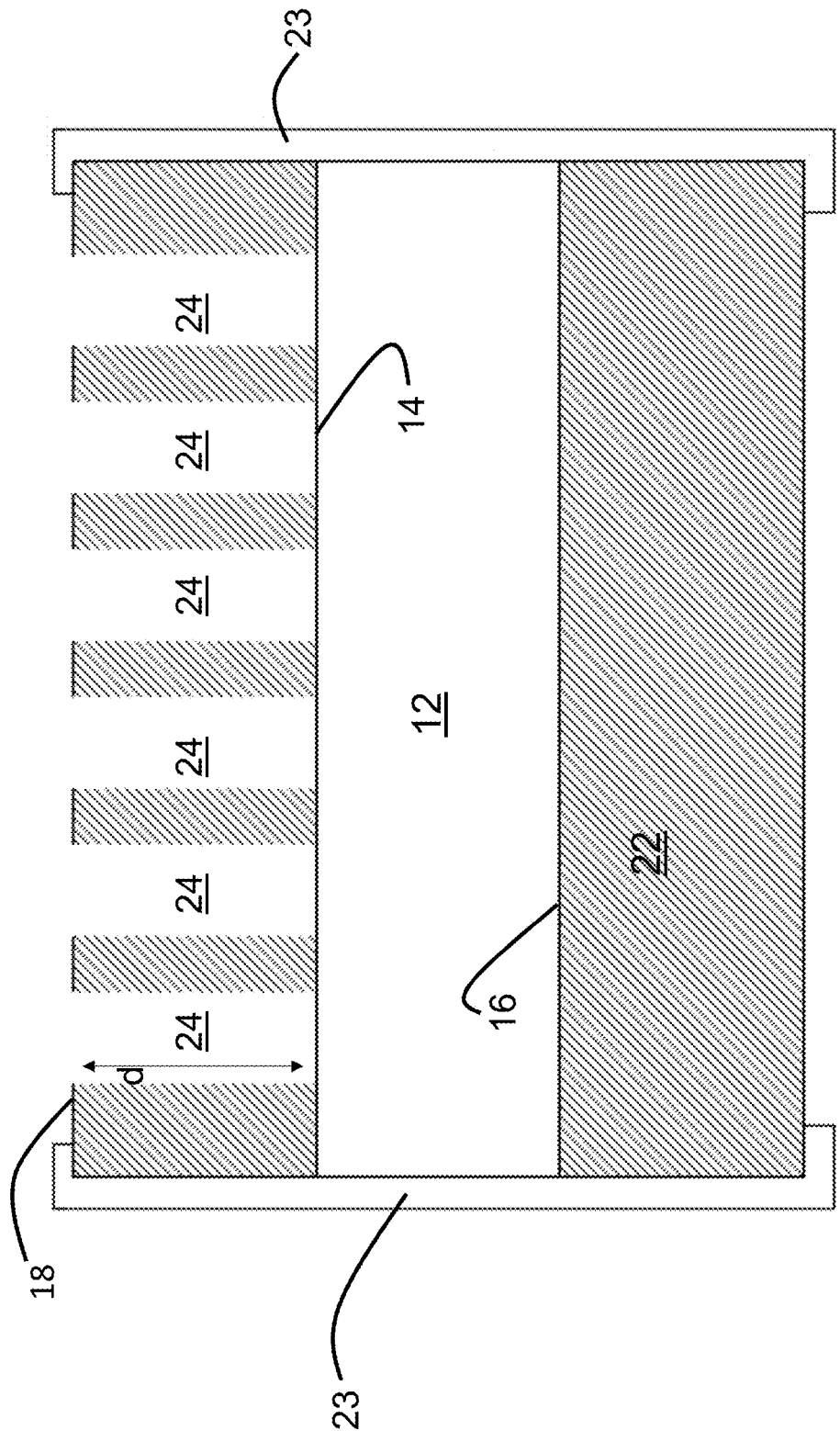
FIG. 1C is a simplified cross-section of a spoof plasmon sensor, in accordance with the features of the present invention.

FIG. 1B provides a simplified cross-sectional view of the superior surface 14 of the substrate 12 of the sensor 10 shown in FIG. 1A and the surface spoof plasmon planar waveguide 20 defined on said superior surface of the substrate. As shown in FIG. 1B, the surface spoof plasmon planar waveguide 20 comprises a dual tapering shape comprised of conductive material 18 positioned on the superior surface 14 of the substrate, wherein said conductive material 18 defines a plurality of rectangular spoof plasmon cavities 24 disposed periodically along the longitudinal axis α of the waveguide. Said dual tapering shape comprises an ovular shape with a semi-major axis a and semi-minor axis b, wherein said semi-major axis a is parallel to the longitudinal axis α of the waveguide, and wherein said semi-minor axis b is parallel to the latitudinal axis β of the waveguide. As shown in FIG. 1B, the first and second ends 20A, 20B of the waveguide comprise conductive material 18 extending to the lateral edges 26 of the sensor 10, wherein the conductive material 18 of the waveguide positioned proximal to the lateral edges 26 of the sensor do not define spoof plasmon cavities 24, and wherein the conductive material 18 adjacent to the lateral edges 26 of the sensor 10 that does not define spoof plasmon cavities 24 comprise microstrips 25 configured to conduct an electromagnetic signal from one or both of the connector(s) 23 to the waveguide 20.

As shown in FIGS. 1A and 1B, the spoof plasmon cavities 24 are rectangular and, as such, each has a corresponding length l and width w. In the exemplary embodiment shown in FIGS. 1A-B, each spoof plasmon cavity 24 is positioned so that the central point C of each spoof plasmon cavity is positioned on the center of the latitudinal axis β of the waveguide, the lengths l of each spoof plasmon cavity 24 are parallel with each other and the latitudinal axis β of the waveguide. And the widths w of each spoof plasmon cavity 24 are parallel with each other and the longitudinal axis α of the waveguide.

To create the dual taper shape shown in the exemplary embodiment of the waveguide 20 shown in FIGS. 1A-B, each spoof plasmon cavity 24 is positioned so that the spoof plasmon cavities are equally spaced from each other (from central point C to central point C). This spacing, also called periodicity, is any suitable distance to allow for an electromagnetic wave to propagate along the surface of the waveguide 20 when the waveguide 20 receives an electromagnetic signal. In an embodiment, the spacing or periodicity between spoof plasmon cavities 24 is between approximately 1 mm and approximately 10 mm, with an exemplary spacing of approximately 5 mm. The sensor 10 can comprise a customizable number of spoof plasmon cavities 24 depending on the intended use, placement, intended analyte etc.

The spoof plasmon cavities 24 comprise areas of the waveguide 20 with rectangular voids 27 in the conductive material 18 (areas where the rectangular shapes were etched in the conductive material or rectangular areas where the conductive material was not deposited). As such, the spoof plasmon cavities 24 comprise areas of substrate 12 that are in fluid communication with the environment surrounding the waveguide 20. Said spoof plasmon cavities 24 also physically contact and are in electromagnetic communication with the conductive material 18 surrounding each cavity 24.

The spoof plasmon cavities have a depth, d as shown in FIG. 1C. Said depth d is the thickness of the conductive material 18 used in making the sensor 10.

Figure 1D:
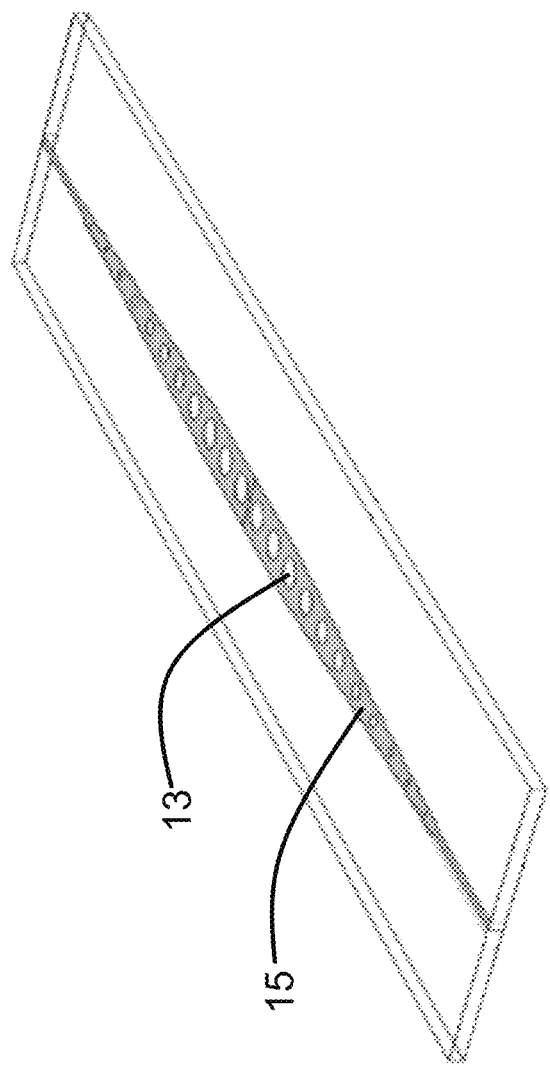
FIG. 1D depicts an alternative embodiment of a spoof plasmon sensor, in accordance with the features of the present invention.

The waveguide 20 described above and shown in FIGS. 1A-B features spoof plasmon cavities 24 that are rectangular. A person having ordinary skill in the art will readily understand that rectangular cavities are only a suitable and exemplary example of a cavity shape suitable for use in a spoof plasmon sensor. In an embodiment, the spoof plasmon cavities can be any shape suitable to allow a wave to propagate on the surface of the substrate 12. In an alternative embodiment of the sensor shown in FIG. 1D, the spoof plasmon cavities 13 comprise circles, wherein the waveguide 15 of the sensor has a dual tapering shape featuring equally spaced apart circles that get progressively smaller going from the center of the waveguide toward the ends of the waveguide. A person having ordinary skill in the art will readily understand that the invention can use a waveguide with a dual tapering shape with cavities of any shape, periodically spaced, and increasing in size toward the center to create said dual tapering shape. A person having ordinary skill in the art will also understand that the dual tapering shape of the waveguide is also exemplary and not meant to be limiting, wherein the waveguide can be any shape suitable to allow a wave to propagate on the surface of the substrate 12.

As described above and as shown in the FIGS., the present invention can utilize a spoof plasmon sensor having a waveguide with a dual tapering shape. The dual tapering shape is exemplary and not mean to be limiting. In an embodiment, the invention can utilize a spoof plasmon sensor having a waveguide of any shape suitable for guiding a wave propagating on the surface of the substrate of said spoof plasmon sensor. In an alternative embodiment, the shape of the waveguide is single tapered with the other end terminated without a taper.

A salient feature of the invention is the substrate 12 comprising the spoof plasmon cavities 24 of the waveguide 20. The substrate is any material capable of supporting propagation of an electromagnetic wave on its surface. In an embodiment, the substrate comprises a material having a permittivity that changes when contacted by an analyte. Suitable and exemplary substrates include metamaterials e.g., polymers such as PTFE, metal organic frameworks (MOFs), coordinational organic frameworks (COFs), biopolymers and biomolecules such as proteins, and combinations thereof. In specific exemplary embodiments, the substrate is a material that changes phase when contacted by an analyte, resulting in a permittivity change of said substrate.

In an embodiment, the substrate comprises an active material that changes in permittivity when contacted by an analyte and a filler material, wherein the filler material can comprise any material suitable to form a composite with the active material of the substrate without interfering with the active material's permittivity changing properties. Generally, filler materials in the substrate are used to increase the dielectric constant, of the substrate reduce the loss and make the substrate reliable for high frequency applications (radio frequency, microwave etc.). Suitable and exemplary include glasses, ceramics, specifically, $TiO_2$, Alumina, graphite, granite, $SiO_2$, $MgTiO_3$, and combinations thereof.

A person having ordinary skill in the art can readily recognize that the dimensions and thicknesses of the various components comprising the sensor 10 can be tailored for suitability to a particular user's intended purpose or setup. In an embodiment, the grounding layer 22 has a length between approximately 135 mm and approximately 145 mm, with an exemplary length of approximately 140 mm, a width between approximately 40 mm and approximately 42 mm, with an exemplary width of approximately 41 mm, and a thickness between approximately 35 µm and approximately 40 µm, with an exemplary thickness of approximately 38 µm. In an embodiment, the conductive material 18 has a length between approximately 135 mm and approximately 145 mm, with an exemplary length of approximately 140 mm, and a thickness between approximately 35 µm and approximately 40 µm, with an exemplary thickness of approximately 38 µm. In an embodiment, substrate 12 has a length between approximately 135 mm and approximately 145 mm, with an exemplary length of approximately 140 mm, a width between approximately 40 mm and approximately 42 mm, with an exemplary width of approximately 41 mm, and a thickness between approximately 0.5 mm and approximately 1.5 mm, with an exemplary thickness of approximately 1 mm.

In an embodiment, the conductive layer 18 comprises any material suitable for conducting an electromagnetic signal. Exemplary and suitable materials include copper, aluminum, silver, gold, platinum, other customary materials used to make electrodes, and combinations thereof.

In an embodiment, the grounding layer 22 comprises any material suitable for conducting an electromagnetic signal. Exemplary and suitable materials include copper, aluminum, silver, gold, platinum, other customary materials used to make electrodes, and combinations thereof.

Figure 2B:
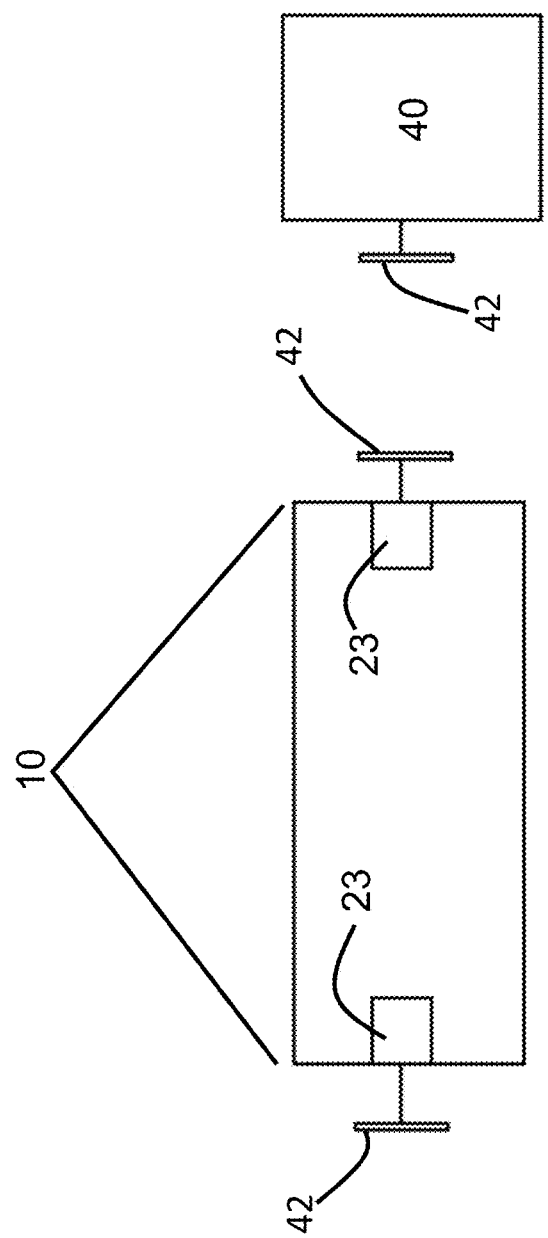
FIG. 2B shows a wireless setup to detect an analyte with a spoof plasmon sensor, in accordance with the features of the present invention.

In operation, the invented sensor 10 receives an electromagnetic signal and transmits a modified electromagnetic signal through one or both of the connectors 23. To receive and transmit such a signal, one or both connectors 23 are in electromagnetic communication with a combined interrogator (electromagnetic radiation source) and sampling assembly 40. In an embodiment, as shown in FIG. 2A, the sensor 10 is in electromagnetic communication with said combined interrogator and sampling assembly 40 through a physical, wired, connection. In an alternative embodiment shown in FIG. 2B, the combined interrogator and sampling assembly 40 is in electromagnetic communication with sensor 10 in a wireless configuration. In such a configuration exemplified in FIG. 2B, one or both of the connectors 23 of the sensor 10 are in physical and electromagnetic communication with an antenna 42. Said antennae 42 are configured to receive and/or transmit an electromagnetic signal from/to an antenna 42 that is in physical and electromagnetic communication with the combined interrogator and sampling assembly 40.

In use, the invented sensor 10 is configured to receive an electromagnetic signal that travels through the waveguide 20, wherein said electromagnetic signal is modified through interacting with the substrate 12 comprising the spoof plasmon cavities 24 of the waveguide 20 to produce a modified electromagnetic signal. As described below, the modification of the electromagnetic signal is a result of changes to the permittivity of the substrate 12 as a result of contact with an analyte. By analyzing the modified electromagnetic signal, a user of the invented system can determine whether an analyte is present and in what concentration in the environment surrounding and contacting the substrate 12 comprising the spoof plasmon cavities 24.

A salient feature of the invention is that the sensor 10 is robust, flexible, and suitable for deployment in a number of different places. In an embodiment, the sensor 10 can be deployed in the energy infrastructure, chemical plants, households, in the internet of things infrastructure. In an embodiment, the sensor 10 can be used in diagnostic methods and point-of-care applications.

Another salient feature of the invention is that the sensor has nearly instantaneous response time. In an embodiment, sensor 10 has almost an instantaneous response time to contact with an analyte wherein substrate 12 of the sensor changes phase when contacted by said analyte. In an exemplary embodiment, the invented sensor 10 has a response time of less than four seconds.

Analyte Detection Detail

Figure 3:
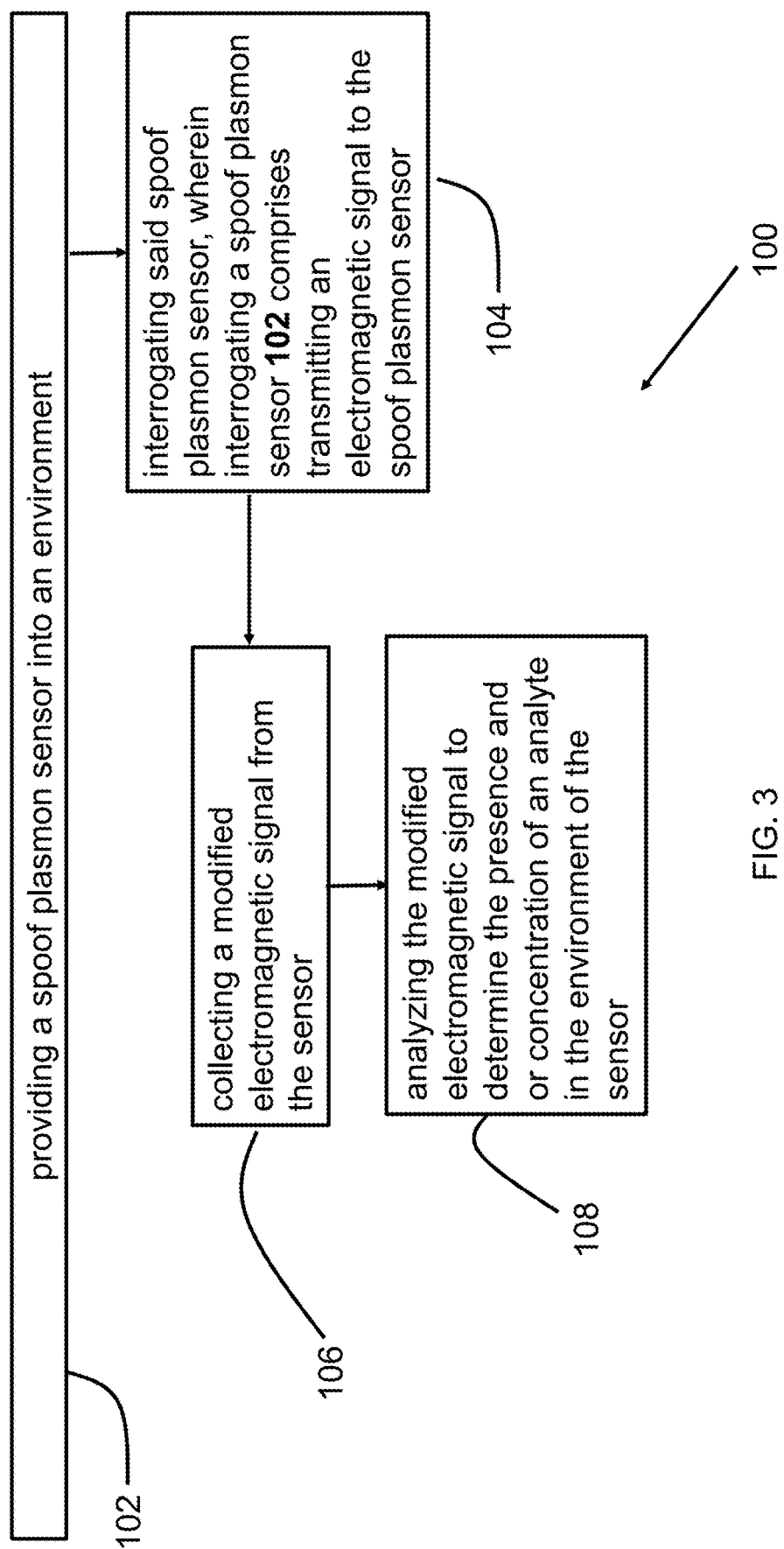
FIG. 3 is a flowchart for a method to detect an analyte using a spoof plasmon sensor, in accordance with the features of the present invention.

A salient feature of the invention is its ability to detect the presence and concentration of an analyte in the environment surrounding and or contacting the substrate 12 comprising the spoof plasmon cavities 24 of the invented sensor 10. FIG. 3 depicts a method 100 to detect the presence and or concentration of an analyte in the environment of a spoof plasmon sensor embodying this feature of the invention. The method 100 begins by providing a spoof plasmon sensor into an environment 102. The method 100 continues by interrogating said spoof plasmon sensor 104, wherein interrogating a spoof plasmon sensor 104 comprises transmitting an electromagnetic signal to the spoof plasmon sensor, and wherein transmitting said electromagnetic signal results in a propagating wave along a waveguide of said spoof plasmon sensor. The method then proceeds by collecting a modified electromagnetic signal from the spoof plasmon sensor 106, wherein said modified electromagnetic signal is generated as a result of an analyte in the environment surrounding the sensor 10 interacting with and changing the permittivity of the substrate 12 comprising the spoof plasmon cavities 24, and wherein the analyte interacting with the substrate 12 comprises contacting said substrate. The method is completed by analyzing the modified electromagnetic signal to determine the presence and or concentration of an analyte in the environment of the sensor 108.

In an embodiment, analyzing the modified electromagnetic signal to determine the presence and or concentration of an analyte in the environment of the sensor 106 comprises determining the signal changes between the electromagnetic signal and the modified electromagnetic signal, and comparing those signal changes with known signal changes caused by contact of the spoof plasmon cavities 24 with a particular analyte and or concentration of a particular analyte.

In another embodiment, analyzing the modified electromagnetic signal to determine the presence and or concentration of an analyte in the environment of the sensor 106 comprises comparing the modified electromagnetic signal with modified electromagnetic signals produced by contact of the spoof plasmon cavities 24 with a particular analyte and or concentration of a particular analyte.

As discussed above, the invented sensor 10 leverages changes to the permittivity of the substrate 12 comprising the spoof plasmon cavities 24 to detect an analyte. In an embodiment, contact with the substrate 12 comprising the spoof plasmon cavities 24 causes the permittivity of said substrate 12 to change because the contact between the analyte and substrate 12 results in a phase change of the substrate 12.

A salient feature of the invention is the ability to detect the presence and or concentration of an analyte contacting the substrate 12 comprising the spoof plasmon cavities 24. In an embodiment, the invented sensor 10 is suitable to detect the presence and concentration of any gaseous analyte contacting the sensor. Suitable and exemplary analytes include $CO_2$, $CO$, $N_2$, $H_2$, $H_2O$, $CH_4$, and combinations thereof. In an embodiment, the invention is suitable to detect any concentration of a gaseous analyte, with exemplary measurable concentrations of gaseous analyte between approximately 100% to approximately 1000 ppm. A person having ordinary skill in the art will readily understand that any analyte that alters the permittivity of the substrate 12 comprising the spoof plasmon cavity 24 can be detected, its concentration determined using the instant invention.

In another embodiment, the invention is suitable to detect the presence and concentrations of a liquid analyte. In this embodiment, the invention is suitable to detect the presence of any liquid analyte that causes a change to the permittivity of the substrate of the sensor when said liquid analyte contacts said substrate. Exemplary liquid analytes include organic solutions, aqueous solutions, inorganic liquids, organic liquids, and combinations thereof. As liquids can be precisely dropcast on the spoof plasmon cavities of the invention, the invention is particularly suitable for measuring the concentration and presence of liquid analyte.

Another salient feature of the invention is the frequency range of the electromagnetic signal used in the instant invention. The invented sensor 10 can utilize electromagnetic signals having any frequency suitable for generating a propagating wave along the surface of the waveguide 20 of the sensor. Exemplary frequencies of the electromagnetic signal suitable for use of the instant invention are microwaves, specifically electromagnetic signals having a frequency between approximately 1 GHz and approximately 100 GHz. The frequency of the electromagnetic signal used with the sensor 10 can be tailored to the properties of the physical sensor being used, analyte being detected, environment of deployment of the sensor, etc. A method of determining the best frequency to use with a spoof plasmon sensor can be found in Shugayev, R. et al., Universal Approach to Rapid Amplified Plasmonic Sensing Using Helix Defect Phase Transition Polymers. *Adv. Funct. Mater.* 2021, 31, 2010644, the entirety of which is incorporated by reference herein.

The plurality of spoof plasmon cavities 24 have no limit related to the reaction kinetics of chemically adsorbed analytes. The plurality of spoof plasmon cavities 24 provide efficient access of analyte to the substrate 12 through periodic perforation of metallic waveguide surface. In its simplest form the structures possess Fabry-Perot resonances which for integer N are described by the phase relation shown in EQUATION 1:

$$K_{ssp} \cdot d + \varphi_r = N \cdot \pi, \qquad \text{EQUATION 1}$$

where $K_{ssp}$ is a spoof plasmon lateral K vector given by EQUATION 2, $$K_{ssp} = \frac{2\pi f n_2(f)}{C} \qquad \text{EQUATION 2}$$

where f is frequency, $n_2(f)$ is refractive indices of the cavity d is the cavity length and $\varphi_r$ is a phase shift due to reflection in the taper. Reflection coefficient of the Fabry-Perot cavity experiences periodic minima due to destructive interference of the reflected waves from the front and the back interface. The magnitude of reflection coefficient of the ideal cavity can be expressed as EQUATION 3, $$r = \frac{E^r}{E^i} = \frac{(\eta_2^2 - \eta_1^2) - (\eta_2^2 - \eta_1^2)\cos(2K_{ssp}d)}{(\eta_2 + \eta_1)^2 - (\eta_2 - \eta_1)^2 \cos(2K_{ssp}d)} \qquad \text{EQUATION 3}$$

with $\eta_1$ and $\eta_2$ being the wave impedances in the medium and cavity regions, respectively, $\eta$ is expressed as EQUATION 4, $$\eta = \sqrt{\frac{\mu}{\varepsilon}}. \qquad \text{EQUATION 4}$$

In the small angle approximation near resonance and for small value of interface reflection coefficient is expressed as EQUATION 5, $$R = \frac{\eta_2 - \eta_1}{\eta_2 + \eta_1} \qquad \text{EQUATION 5}$$

in the passband it reduces to $r \propto (K_{ssp}d)^2$ with complete cancellation at the resonance, $2K_{ssp}d = 2\pi N$. In one specific embodiment, a sensing response was achieved by monitoring the frequency shift of the reflection coefficient resonant dip at f=6.565 GHz in response to varying effective permittivity of the substrate and surrounding media.

Sensor Assembly Detail

A sensor of the design shown in FIGS. 1A-C was fabricated with a substrate made of a mixed Polytetrafluoroethylene (PTFE) $TiO_2$ substrate that is commercially produced by the Roger's Corporation of Chandler Arizona. The produced sensor featured a substrate having planar dimensions of 140 mm×41 mm and a thickness of approximately 1 mm, the conductive material 18 was copper having a thickness of approximately 38 µm, and the grounding layer 22 was copper having a thickness of approximately 38 µm. The fabricated sensor 10 had a waveguide 20 defining spoof plasmon cavities 24 spaced 5 mm apart with the central cavity having a length l of approximately 4.5 mm and a width w of approximately 2 mm, wherein spoof plasmon cavities scale linearly in size to produce the dual taper shape described above. The produced waveguide 20 tapered to a microstrip 25 having a width of approximately 0.9 mm. A person having ordinary skill in the art will readily discern that the invented sensor can be manufactured using myriad manufacturing techniques. An exemplary technique is described in Li et al., OVERCURRENT PROTECTION: REFERENCE DESIGN & STUDY, ECE 480: Senior Design Pre Proposal, Texas Instruments, 2011, the entirety of which is incorporated by reference herein.

Phase Change Substrate Detail

As discussed above, an embodiment of the invented sensor 10 leverages phase changes in the substrate 12 of the sensor when said substrate is contacted by an analyte, those phase changes resulting in changes in permittivity to the substrate which can be measured to determine the presence and concentration of said analyte.

Figure 4:
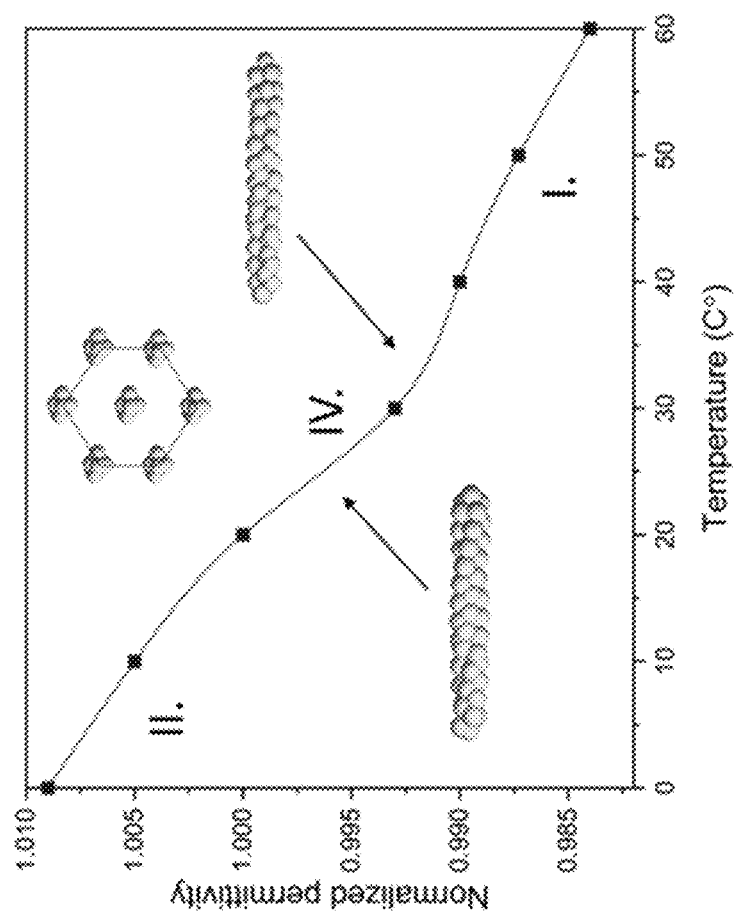
FIG. 4 is a permittivity phase diagram for PTFE with the molecular structure for PTFE $15_7$ phase, disordered helical phase and the crystal structure overlaid, in accordance with the features of the present invention.

The exemplary embodiment of the invented sensor 10 produced and tested herein used a substrate 12 primarily comprising PTFE, a polymer having the formula $(C_2F_4)_n$. PTFE, due to its structure containing fluorine atoms tightly surrounding carbon chains, is almost completely chemically inert and hydrophobic, however, the inventors have discovered that its phase transition is strongly influenced by the electrostatic gas interactions. PTFE has been identified to have a hexagonal crystal structure near room temperature and atmospheric pressure and has also been shown to exhibit phase transitions at two characteristic temperatures as shown in FIG. 4.

It has been demonstrated previously that as temperature is increased at 20° C. the helically shaped PTFE molecules untwist from $13_6$ (Phase II) to $15_7$ (Phase IV) helical symmetry. Here the helical notation signifies the azimuthal frequency of rotation, i.e., $15_7$ helix undergoes rotation by $\Delta\varphi=2\pi\cdot7/15$ when shifted by one unit along the chain. Subsequently at 30° C. the ordered $15_7$ crystalline phase undergoes further untwisting into a largely orientationally disordered helical phase (Phase I) with positional order fully disappearing at 150° C., that is $\langle \exp(i\delta\varphi) \rangle =0$. Phase transitions between the symmetries result in rapid density and corresponding permittivity reductions due to the change in lattice constant of the associated hexagonal unit cell. Particularly, for Phase IV—Phase I transition lattice constant evolves from $a_{IV}=0.566$ nm to $a_I=0.567\text{-}0.574$ nm. These transitions are driven by creation and migration of helix reversal defects (L→R, R→L) whose concentration determines the equilibrium phase points. Helix reversal defects grow in number with increased temperature and have soliton-like behavior, i.e., they can propagate along helical axes of the molecule to combine into larger helix reversal domains. Single helix reversal defect has poor mobility since its motion requires long range PTFE helix reorganization which has a high energy threshold; therefore helix defect motion has been shown to be dominated by 'twin' defects. The length between two helix reversals on the same chain in such defect is an integer number of the period, $L_{2\pi}=N*15$ units and for coherent twin defect N=1.

Experimental Parameters

The base relative permittivity of the PTFE substrate used to produce the exemplary device described above was $\varepsilon_{sub}=10.7\pm0.5$. Permittivity was used as a fitting parameter for matching experimental/modeling results for S11 (shown in FIG. 5 wherein the solid line shows experimental results and dashed line shows modeling results) and for simulations was taken as $\varepsilon_{sub}=11.1$.

The S parameters were obtained using Keysight P5224A network analyzer. Spectrum was obtained with 20 MHz sampling window centered at the resonance with 1000 discrete points. The IF frequency was set to 20 Hz and the excitation power was 15 dBm. The exemplary spoof plasmon sensor 10 was terminated into 50 Ohm load for the cable connected tests. The gas cell fixture consisted of hermetically sealed acrylic cylinder, L=230 mm and D=60 mm, with gas and instrumentation connectors. Gas flow was controlled using calibrated mass flow controllers. Gas back pressure was kept constant at 20 psi and all the gases were kept at room temperature 21.5° C. For variable temperature measurements the temperature at the device was controlled using K-type thermocouple.

The Attenuated Total Reflectance-Fourier Transform Infrared Spectroscopy (ATR-FTIR) spectroscopy data was obtained using Nicolet iS50 FTIR spectrometer. The FTIR measurements were taken with scanning resolution of 4 cm$^{-1}$ and averaged over 100 scans. The in-situ experiments were performed at 16 psi steady gas flow on the powdered sample with 0.3 mm average particle size. The powdered PTFE substrate sample was mixed with methanol and then applied to a ZnSe crystal rod. The methanol, due to its volatile nature, evaporated prior to measurement. The sample coated crystal rod was placed in custom-designed Spectra Tech ATR cells prior to IR measurements. For the time-response experiment conducted using FTIR, the scanning resolution was 4 cm$^{-1}$ and the response averaged over 5 scans every 4 seconds.

All simulations were performed using the COMSOL mutiphysics package. Dispersion relations were produced using an eigen-solver applied to the unit cell of the spoof plasmon waveguide, that data shown in Shugayev, R. et al., Universal Approach to Rapid Amplified Plasmonic Sensing Using Helix Defect Phase Transition Polymers. Adv. Funct. Mater. 2021, 31, 2010644. Copper with skin depth $\delta=0.8$ um at 6.5 GHz was modeled using the impedance boundary condition as $\delta << s_{metal}$ was valid. Copper conductivity was taken to be 5.998E7 S m$^{-1}$. Device SMA connectors were explicitly included in the SSP waveguide/taper simulations.

Figure 6A:
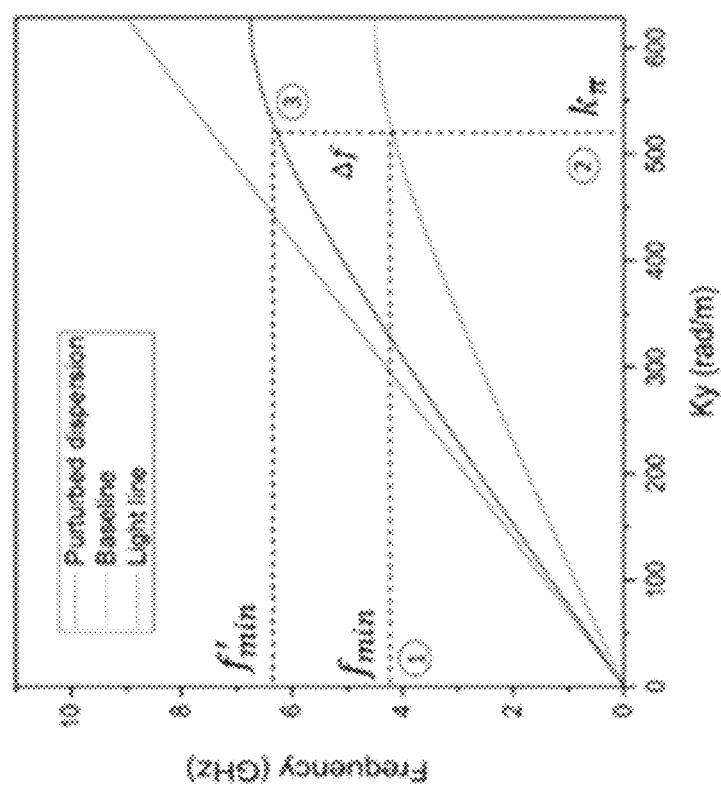
FIG. 6A is a schematic for a procedure to estimate frequency shift $\Delta f$ of a spoof plasmon sensor induced by perturbation, in accordance with the features of the present invention.
Figure 6B:
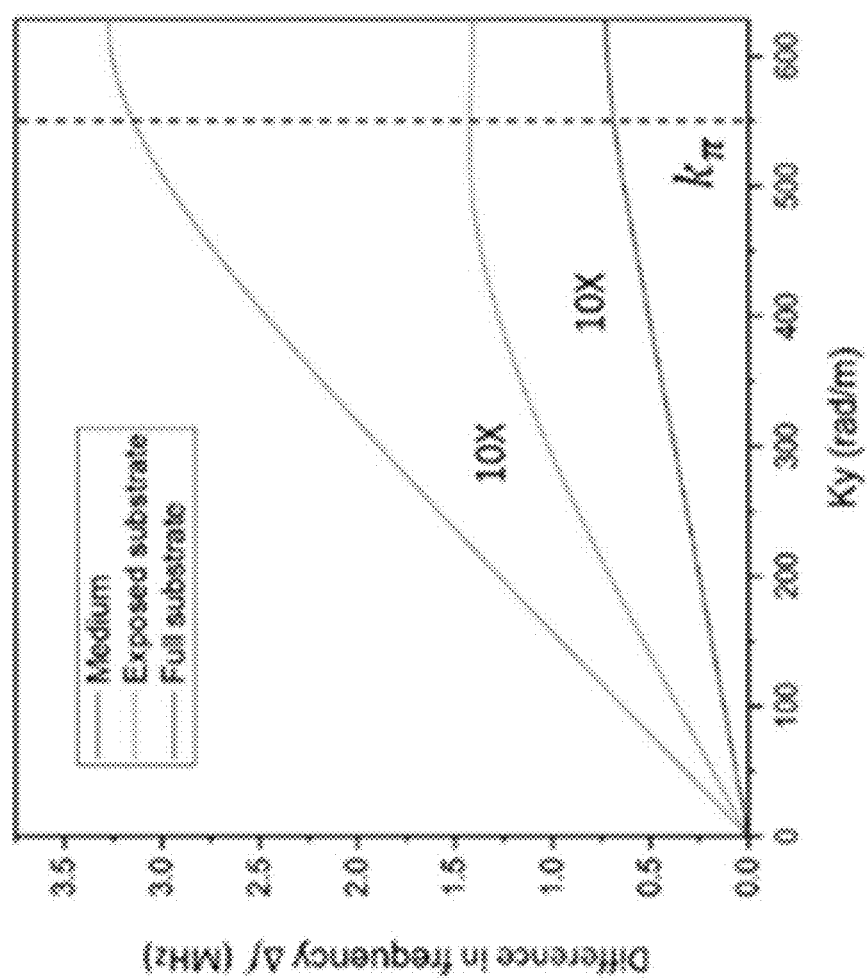
FIG. 6B is a graph showing the difference in dispersion between baseline and perturbed substances for 0.1% permittivity increase of the full substrate, in accordance with the features of the present invention.

Analyses herein considered permittivity perturbation due to the overlying conductive material and the substrate. The modeled substrate perturbations were that of the full substrate and of the thin exposed layer near the substrate surface to cover possible cases of full substrate gas penetration and partial, transport limited gas adsorption. A 0.1 mm thick layer of the substrate immediately below the exposed parts of the sensor waveguide is shown in Shugayev, R. et al., Universal Approach to Rapid Amplified Plasmonic Sensing Using Helix Defect Phase Transition Polymers. Adv. Funct. Mater. 2021, 31, 2010644. The thickness of the layer was chosen to correspond to one decay length of the maximum electric field magnitude. An expanded set of simulated data for additional cases is given in Shugayev, R. et al., Universal Approach to Rapid Amplified Plasmonic Sensing Using Helix Defect Phase Transition Polymers. Adv. Funct. Mater. 2021, 31, 2010644. As frequency shifts for small medium/substrate perturbations are additive, the combined effects can be analyzed as a sum of frequency shifts. The shape of dispersion relation dependency on local permittivity changes deviates from purely asymptotic in vicinity of spoof plasmon resonance due to variations in local field distribution. Comparison of semi-analytical estimates for frequency response with full-wave simulations of spoof plasmon waveguide/taper structure as shown in FIGS. 6A-B provide a good match. A 4.5% higher sensitivity obtained in the full-wave method was observed, due to changes in the taper $\varphi_r$, which were neglected in the semi-analytical approach.

Figure 5:
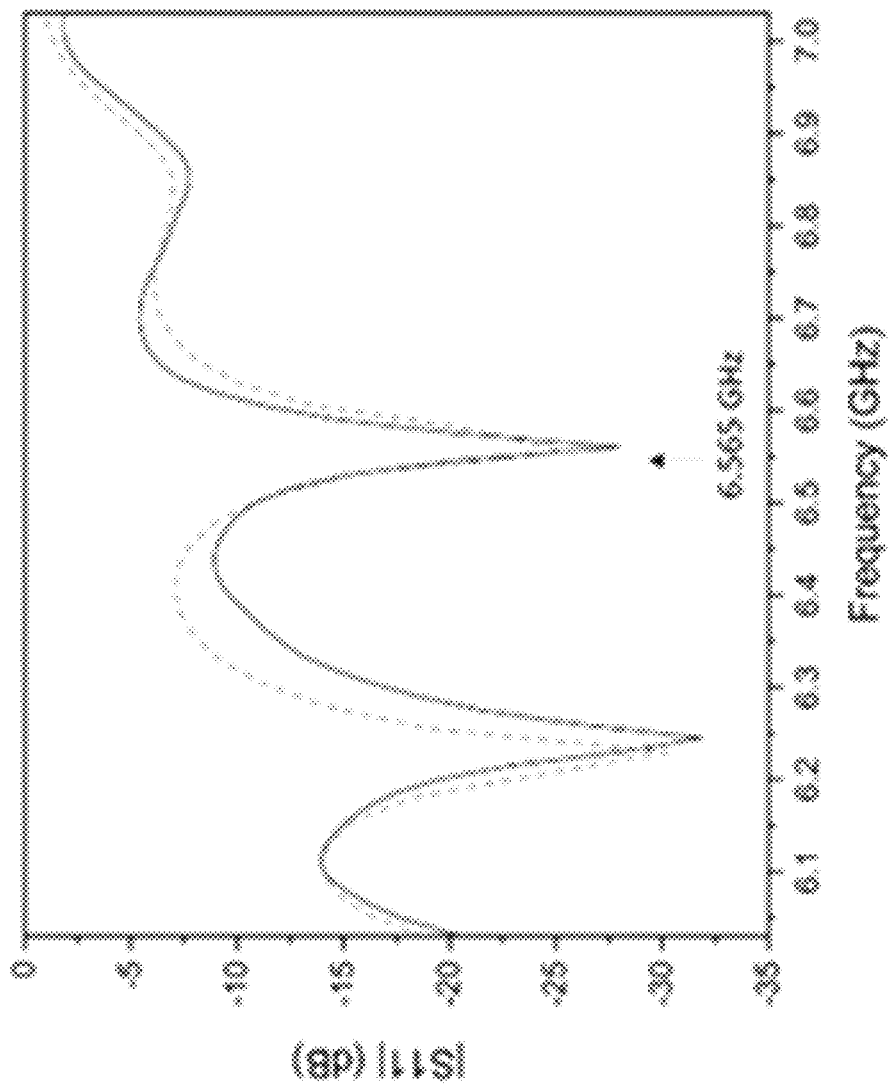
FIG. 5 is a graph showing experimental and modelling data for S11 frequency response of a spoof plasmon sensor, in accordance with the features of the present invention.

The observed frequency response of reflection coefficient for the fabricated device exhibited sharp Fabry-Perot resonances with free spectral range (FSR) of 315 MHz in good agreement with simulated results for which a FSR of 325 MHz was predicted as shown in FIG. 5. Non-vanishing value of the SSP Fabry-Perot cavity reflection coefficient at the resonance corresponds to imperfect cancellation and can be attributed to nonzero distributed reflections at the taper.

For wireless testing the device was terminated in open circuit to increase reflected signal. The weighted average wireless detection comprised of averaging over 100 sample windows according to EQUATION 6:

$$f_{peak} = \frac{\sum S11 * f}{\sum S11} \quad \text{EQUATION 6}$$

where measured $S11=S11_{antenna}+S11_{reflected\ sensor}$.

The base dielectric permitivities of analyzed gases in this application were taken as those of DC values which is valid for nonpolar gases due to the absence of the gas transitions in MW range. Permittivity values of the pure gas phases at ambient pressure were obtained from J. W. Schmidt et al. Int. J. of Thermophys 2003, 24, 375 and et al., Int. J. of Thermophys 2001, 22, 859, the entirety of both incorporated by reference herein, and are listed in TABLE 1. Quadrupole moment values for gases were taken from R. Phani, K. P. Prasanth, D. Patil, R. S. Somani, R. V. Jasra, and H. C. Bajaj, J. Porous Mater. 2011, 18, 205, the entirety of which is incorporated by reference herein.

TABLE 1

|  | $N_2$ | $CO_2$ | $CH_4$ |
|---|---|---|---|
| $\varepsilon_r$, 21.5° C. | 1.00054 | 1.00094 | 1.00082 |
| $\varepsilon_r$, 40° C. | 1.00051 | 1.00088 | 1.00077 |
| Quadrupole moment ($\times 10^{-40}$ C m$^2$ | −4.91 | −13.71 | 0 |

EXAMPLES

A number of experiments were performed according to the testing parameters and setup described above to demonstrate the ability of the instant invention to detect the presence and concentration of a gaseous analyte in the environment surrounding an embodiment of the invented spoof plasmon sensor 10.

Figure 7A:
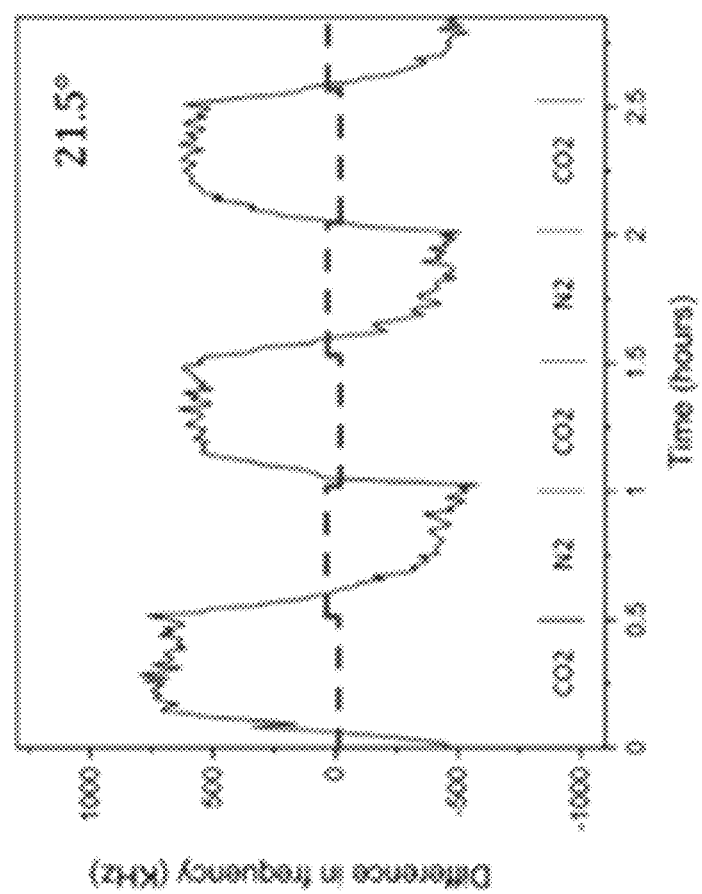
FIG. 7A is a graph showing experimental and simulated results for gas sensing at 21.5° C. using a spoof plasmon sensor, in accordance with the features of the present invention.

In one example, the sensor 10 was alternatingly exposed to streams of $N_2$, and $CO_2$ at a temperature of 21.5° C. For this example, the sensor 10 was continuously interrogated and its output monitored while being exposed to the indicated gas streams, each gas flowing at a rate of 20 mL min$^{-1}$. The results of this experiment are shown in FIG. 7A. In FIG. 7A, solid lines show experimental results, dashed lines showing modelling results.

As shown in FIG. 7A, the sign of the change in resonant frequency provides an insight into mechanism behind the observed response. Examining Equation (1) and employing perturbation theory it can be seen that an increase in dielectric permittivity of ideal cavity could only result in lowering of the resonant frequency expressed for small $\Delta \varepsilon$ as shown in EQUATION 7 below:

$$\frac{\Delta f}{f} \approx -\frac{\iiint \Delta \varepsilon |E_0|^2 dr}{2 \iiint \varepsilon |E_0|^2 dr} \quad \text{EQUATION 7}$$

Figure 6C:
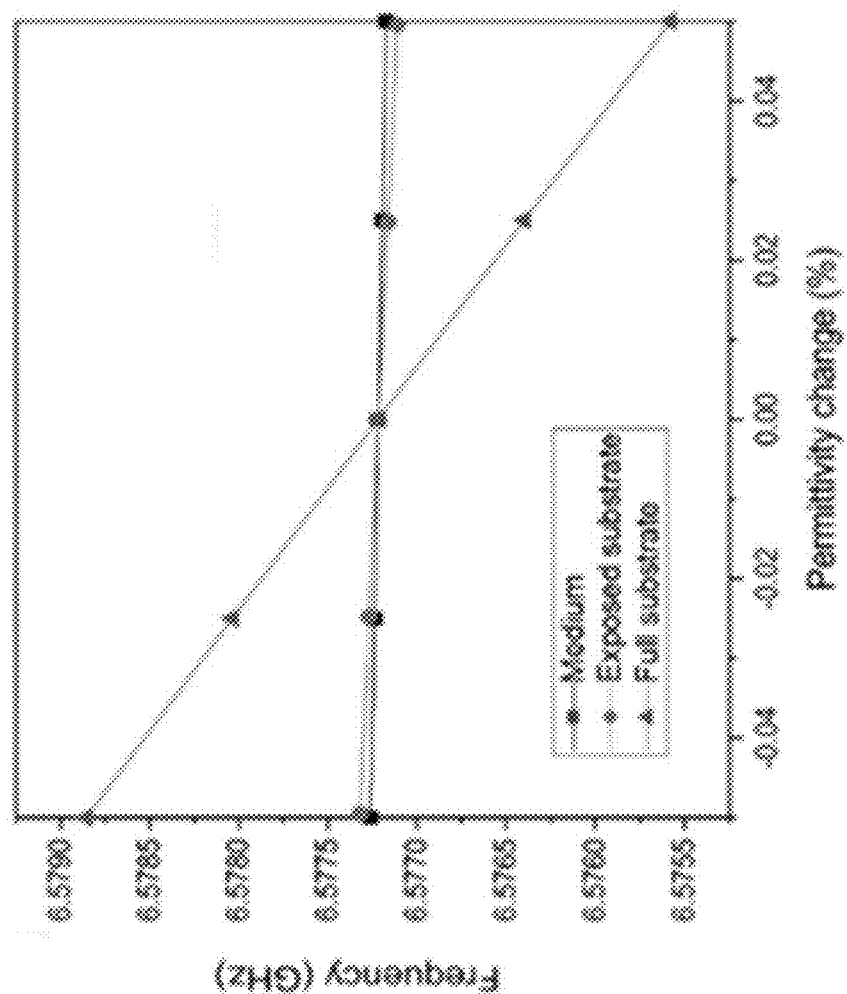
FIG. 6C is a graph showing the resonance frequency for the corresponding percent change in the permittivity obtained using full-wave simulations, in accordance with the features of the present invention.

This trend was confirmed in modelling results with both semi-analytical and full-wave simulations as shown in FIGS. 6B-C. However, the experimental results for $N_2/CO_2$ transition with a positive $\Delta \varepsilon = 0.000397$ within the overlying gas phase medium show an increase in the device resonant frequency. Based on the literature regarding the dependency of PTFE substrate permittivity on its structural phases discussed above, the observed response was attributed to a $CO_2$ induced phase transition in PTFE resulting in lowering of the substrate effective permittivity. Indeed, PTFE disorder promoting interactions with selected analytes would have the same physical effect as a disorder inducing temperature increase on the PTFE helices, i.e., lowering of the transition threshold temperature. As can be seen from FIG. 4, any motion towards disordered state by increasing temperature will result in reduction of permittivity value. Unlike previously reported gas/polymer interactions this mechanism does not involve formation/breaking of the bonds or protonation and instead is based on PTFE molecule ability to rapidly switch between helicities at the phase transition point.

Figure 7B:
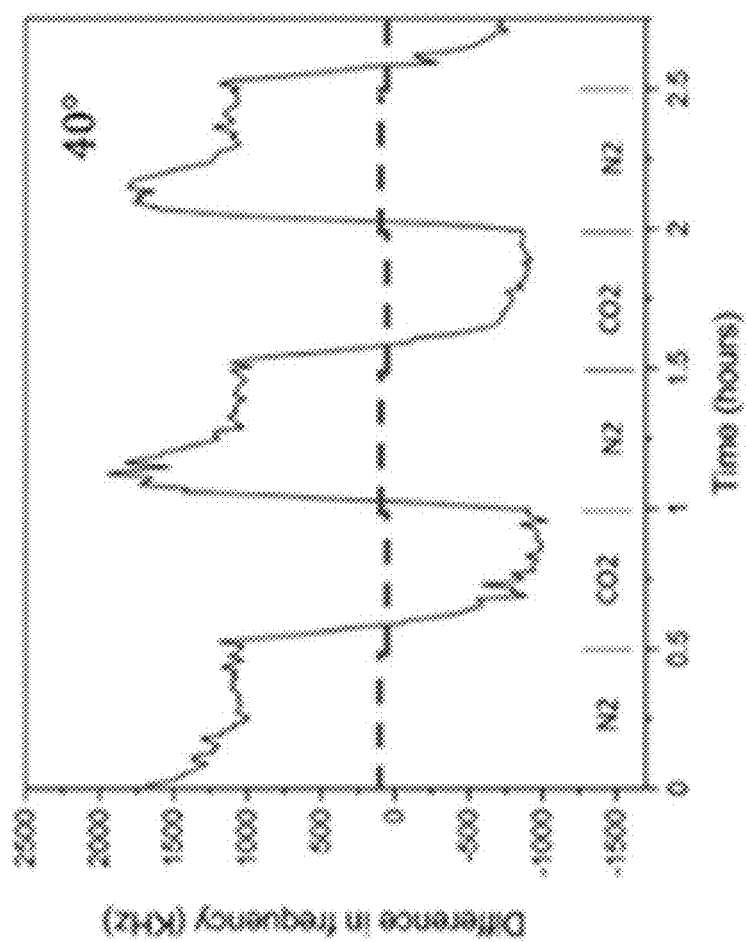
FIG. 7B is a graph showing experimental and simulated results for gas sensing at 40° C. using a spoof plasmon sensor, in accordance with the features of the present invention.

To further elucidate $CO_2$ induced substrate phase transition, measurements were performed using the exemplary sensor 10 during 0.5 hour $N_2/CO_2$ cycles at the elevated 40° C. and room (21.5° C.) temperatures as PTFE IV→I phase transition is reported to be localized to the ~20-30° C. range, with results for this testing shown in FIGS. 7A-7B. Measurements were taken before and 1 hour after temperature ramp up to 40° C. A switch in sign of the frequency shift in $N_2 \rightarrow CO_2$ transition, consistent with a phase transition confined to a narrow temperature window, was observed. The magnitude of frequency change is also increased at elevated temperature from ($\Delta f = 1$ MHz) to ($\Delta f = 2$ MHz). The overall frequency shift ($\Delta f_{DC} = 35$ MHz) due to substrate permittivity dependence on temperature corresponded well with modelled results ($\Delta f_{DC} = 32$ MHz) using temperature permittivity data (FIG. 4). Comparing $CO_2/N_2$ gas cycling data at 40° C. shown in FIG. 7B, it can be observed that experimental amplitude of frequency change was amplified by a factor of 41 versus linear modelling results. In FIG. 7B, solid lines show experimental results, dashed lines showing modelling results.

Corresponding simulation results were obtained using combined overlaying medium and full substrate response to gas permittivity changes. For modelling purposes substrate permittivity change was assumed to be due to constituent gas permittivity of the air voids and total substrate permittivity was computed using Maxwell-Garnett effective medium approximation shown as EQUATION 8 below, $$\varepsilon_{\text{eff}} = \varepsilon_m \frac{2v(\varepsilon_{\text{air}} - \varepsilon_m) + \varepsilon_{\text{air}} + 2\varepsilon_m}{2\varepsilon_m + \varepsilon_{\text{air}} - v(\varepsilon_{\text{air}} - \varepsilon_m)} \quad \text{EQUATION 8}$$

where $\upsilon$ is the air void volume fraction and $\varepsilon_m$ is permittivity of PTFE/TiO$_2$ matrix. At room temperature the total modelled change in sensor response during $N_2/CO_2$ transition was 52.2 KHz which comprised of 69% and 31% change due to medium and substrate permittivity respectively.

Figure 7C:
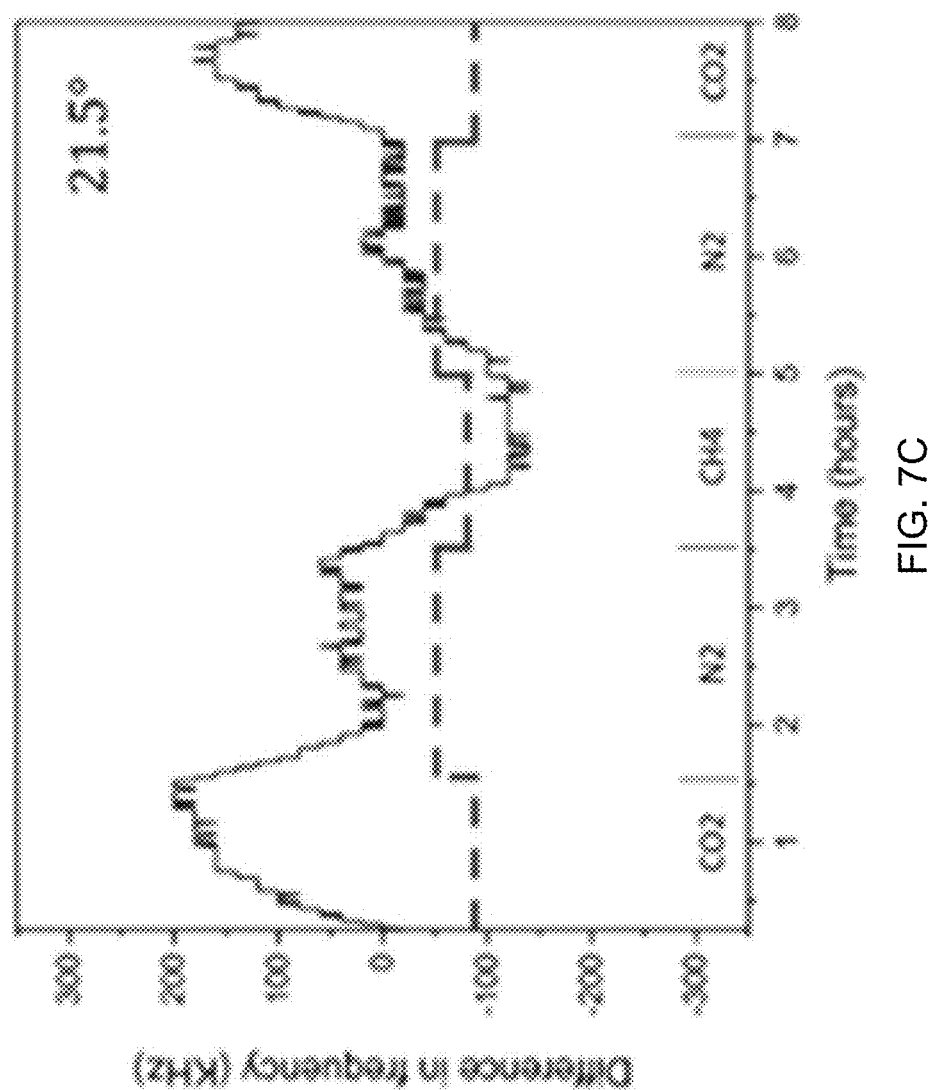
FIG. 7C is a graph showing further experimental and simulated results for gas sensing at 21.5° C. using a spoof plasmon sensor, in accordance with the features of the present invention.

In another example, the sensor 10 was exposed to alternating cycles of $CO_2$, $N_2$, $CH_4$ with positive gas phase $\Delta \varepsilon$ for both $N_2/CO_2$ and $N_2/CH_4$ transitions, the results of this example shown in FIG. 7C. In FIG. 7C, solid lines show experimental results, dashed lines showing modelling results. The spoof plasmon sensor 10 response displayed a positive frequency shift for $N_2/CO_2$ and negative shift of the lower magnitude for $CH_4$ as shown in FIG. 7C. This confirms expected response based on quadrupole mediated interactions since the magnitudes of quadrupole moment are related as $CH_4 < N_2 < CO_2$ shown in TABLE 1. Quadrupole moment is a fundamental physical parameter with a large number of simple molecules possessing unique nonzero quadrupole moment making this sensing mechanism universally applicable.

Figure 8A:
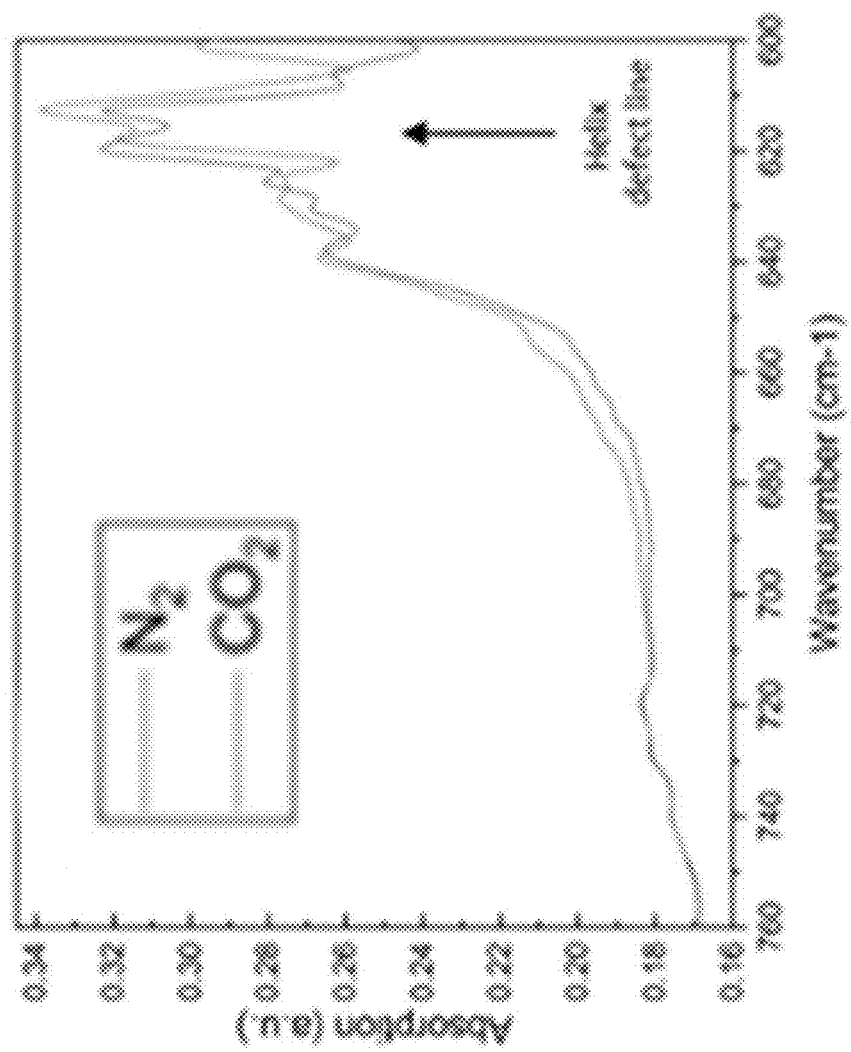
FIG. 8A shows FTIR spectroscopy results of a PTFE substrate sample at 21.5° C. and 40° C., in accordance with the features of the present invention.
Figure 8B:
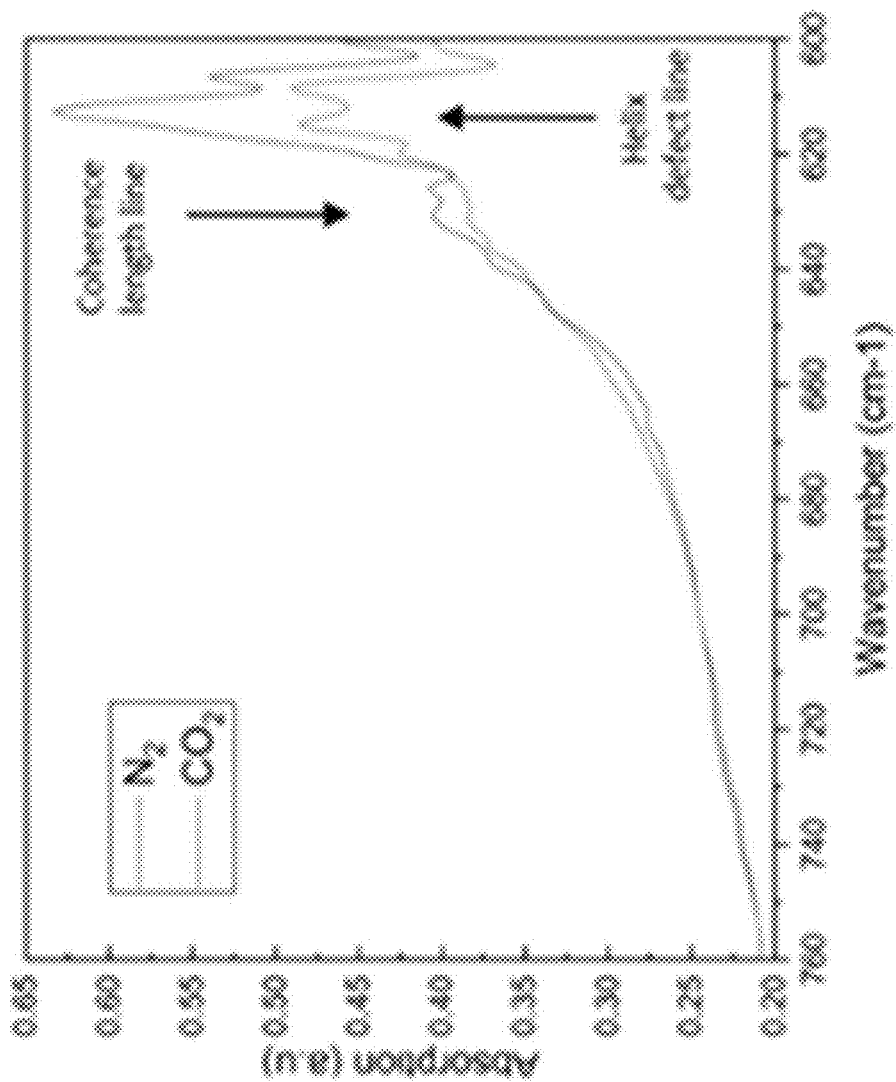
FIG. 8B shows FTIR spectroscopy results of a PTFE substrate sample showing helical structure modifications when the sample is contacted by $N_2$ and then $CO_2$ at 40° C., in accordance with the features of the present invention.

Additionally, Fourier Transform Infrared spectroscopic (FTIR) characterization of substrate samples using in situ IR spectroscopy was performed. Earlier ab initio IR studies of PTFE have linked 610-620 cm$^{-1}$ spectral peaks to PTFE helix reversal defects and 625-640 cm$^{-1}$ band was proposed as quantitative measure of coherence length of the regular PTFE helix chains. Characteristic growth of 610-620 cm$^{-1}$ line during temperature increase from 13 to 50° C. has been demonstrated in that work and was confirmed in the results of the IR spectroscopy carried out at 21.5° C. and 40° C. discussed herein and shown in FIG. 8A. Also, as can be observed in FIG. 8B, at room temperature, $CO_2$ exposure leads to increase in helix defect number manifested by growth of 610-620 $cm^{-1}$ absorption peak. On the other hand, $CO_2$ addition at 40° C. produces significant decrease in helix reversal 610-620 $cm^{-1}$ line as shown in FIG. 8B, implying reduction in defect density and lattice constant of PTFE. This indicates that at elevated temperatures there exists a different phase transition mechanism accompanied by a motion towards a low defect state. The magnitude of 625-640 $cm^{-1}$ band was also reduced signaling decrease in coherence length of PTFE helix chains. Both high temperature and low temperature observations corroborate corresponding spoof plasmon sensor sensing results.

Mechanistically gas molecules can enhance creation and recombination of helix reversal defects. At the lower defect concentration $CO_2$ molecule dipole fluctuations would lead to creation of additional helix defects and therefore lower phase transition threshold. At the higher defect concentration clustering of defects would take place and the $CO_2$ interactions would aid cluster defect recombination. In our experiments the elevated temperature gas cycling is accompanied by small decrease of 625-640 $cm^{-1}$ and a large reduction of 610-620 $cm^{-1}$ IR lines with addition of $CO_2$.

Figure 8C:
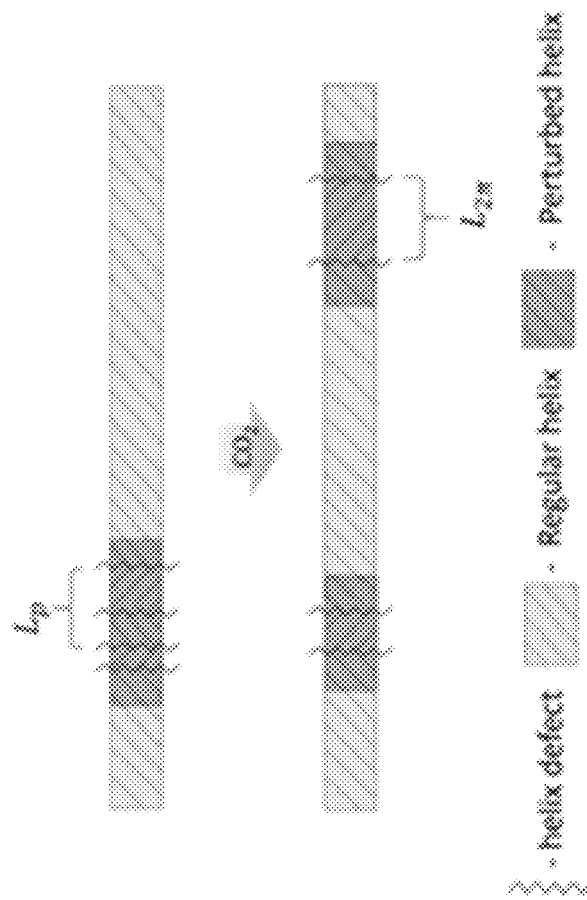
FIG. 8C is a schematic of the phase transition mechanism in PTFE polymer, in accordance with the features of the present invention.

It supports a notion of transition from high concentration defect state characterized by clustered defects combined with defect-free stretches of molecular helices towards lower concentration defect state with more uniformly distributed defects as shown in FIG. 8C.

Figure 9:
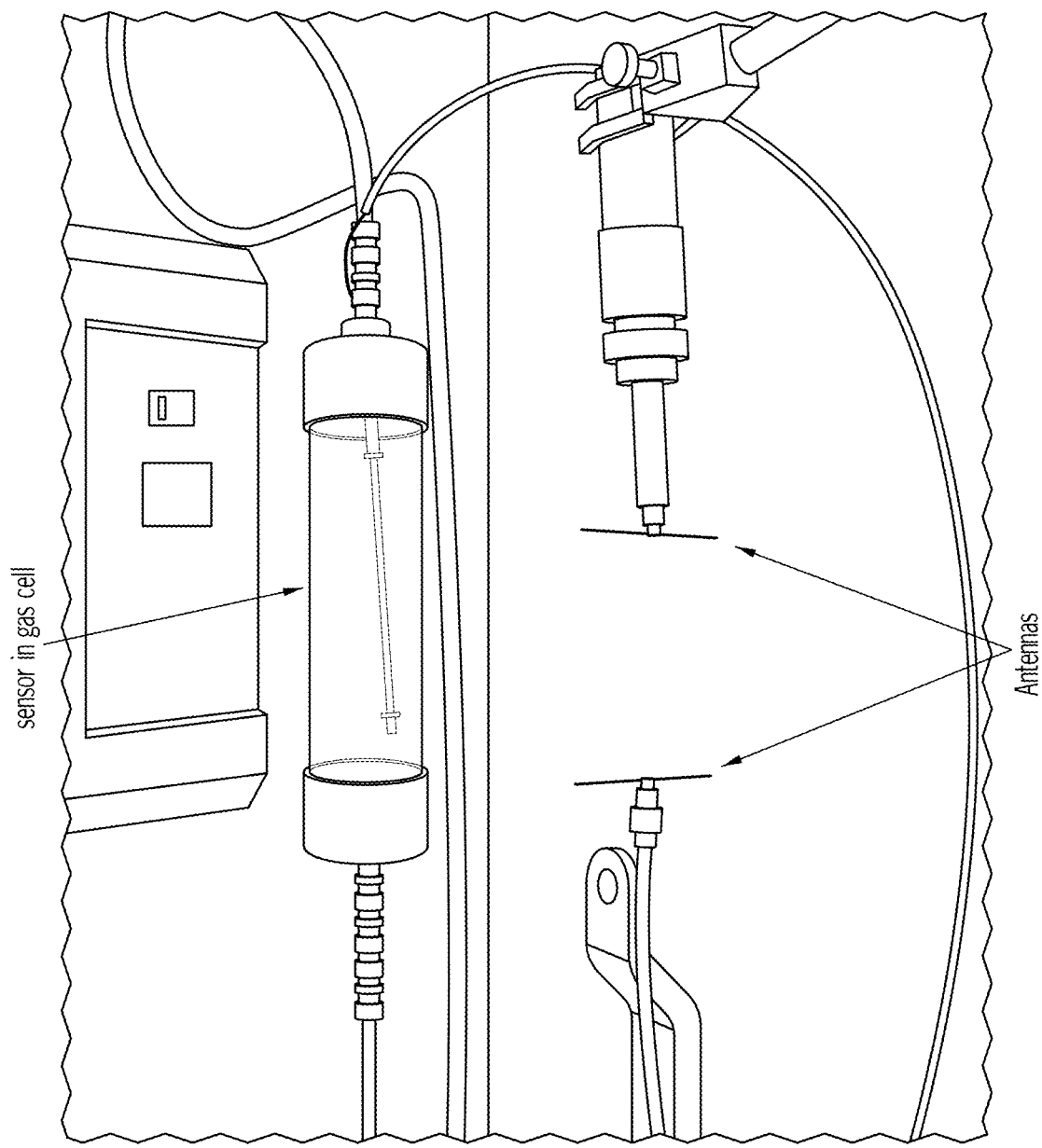
FIG. 9 is a photograph of a testing setup of a wireless spoof plasmon sensor for detecting a gas, in accordance with the features of the present invention.
Figure 10A:
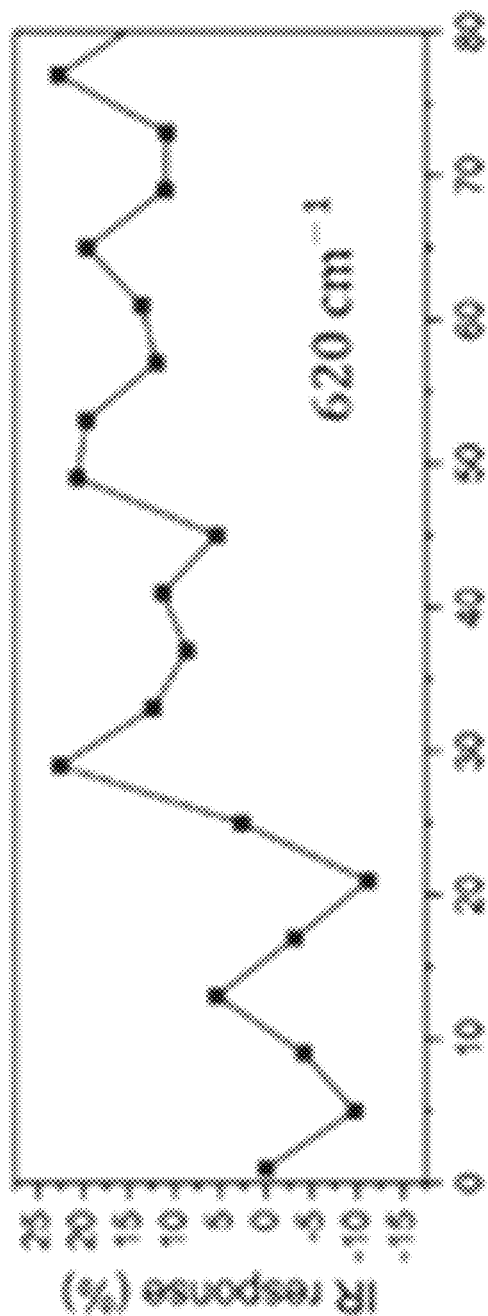
FIG. 10A is FTIR spectroscopy results of a PTFE sample during the transition between being contacted with $N_2$ to being contacted with $CO_2$, FIG. 10A showing the percentage change in the PTFE band (610-620 $cm^{-1}$), in accordance with the features of the present invention.
Figure 10B:
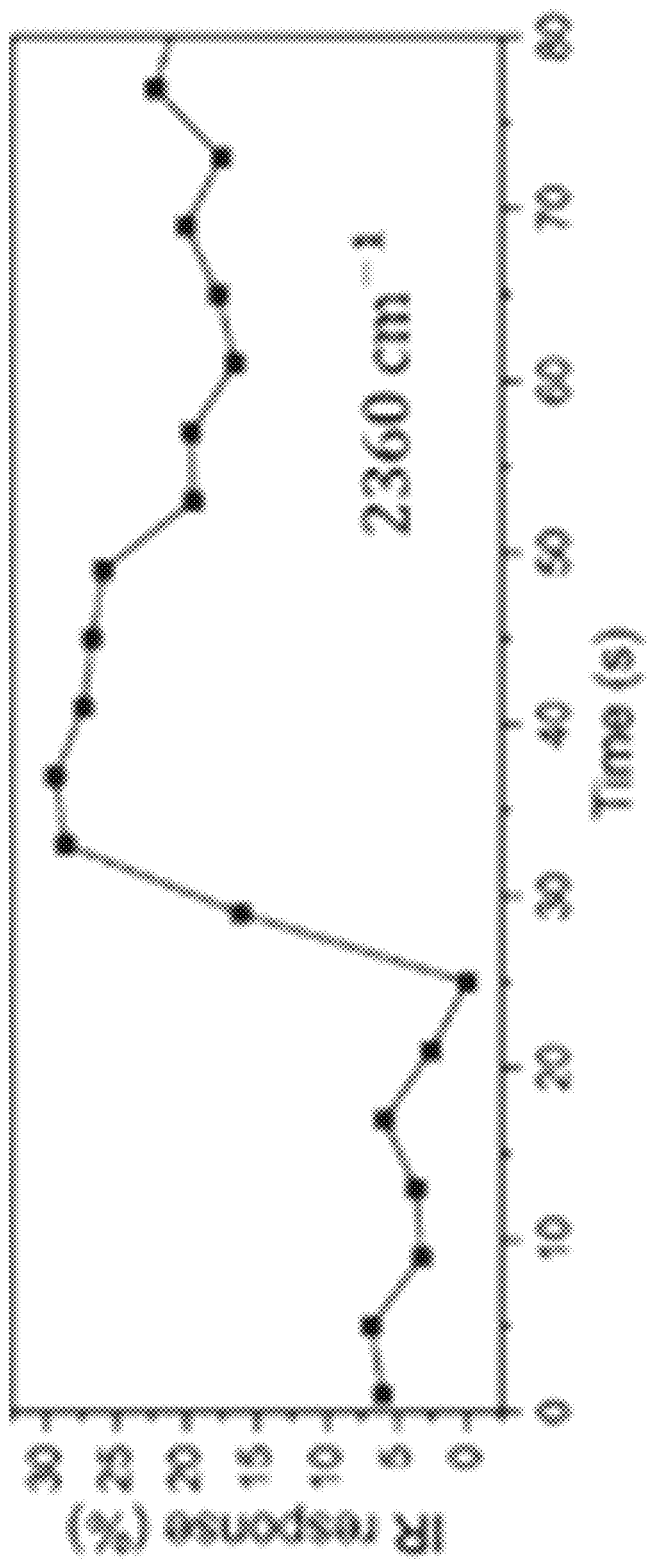
FIG. 10B is FTIR spectroscopy results of a PTFE sample during the transition between being contacted with $N_2$ to being contacted with $CO_2$, FIG. 10B showing the percentage change in the $CO_2$ band (2360 $cm^{-1}$), in accordance with the features of the present invention.

The response time in the spoof plasmon gas detecting experiments was limited by large cell volume as shown in FIG. 9 and maximum gas flow of 100 mL $min^{-1}$. In order to demonstrate rapid response of the PTFE to the $CO_2$ gas time resolved FTIR tests were performed in the small volume sample. These tests involved simultaneously monitoring $CO_2$ 2360 $cm^{-1}$ line and the PTFE 610-640 $cm^{-1}$ transition while switching from $N_2$ to $CO_2$ gas flow, with the results of these tests shown in FIGS. 10A-10B. The time step of data collection was set at 4 seconds. Surprisingly and unexpectedly, the sensor provided a fully synchronized response without any delay of the PTFE phase transition to $CO_2$ gas addition.

The physical mechanism behind the gas sensitivity of phase transitions in PTFE is linked to the gas molecule/helix reversal defect interaction. It has been shown that strong $CO_2$ quadrupole moment can play a dominant role in gas separation in coordination polymer networks. At the same time the quadrupole interactions are mediated by gradients of electric field on the adsorbent surface which would be expected at the localized sites of helix reversal dislocations due to increased asymmetry around the nuclei.

Figure 10C:
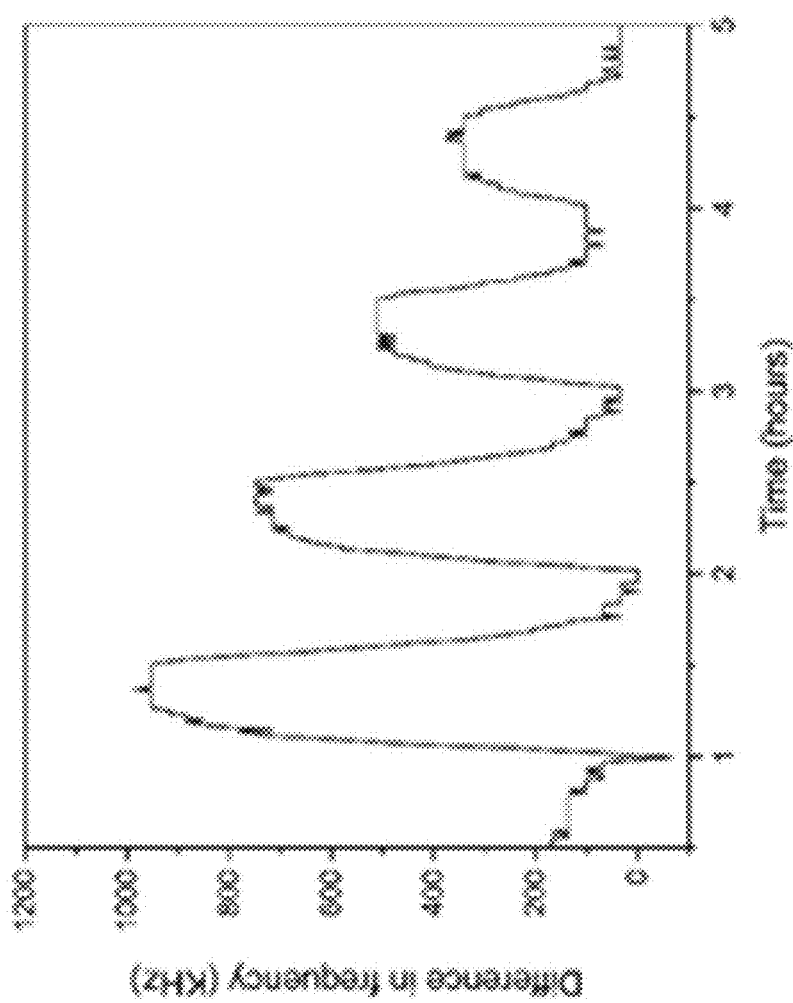
FIG. 10C shows the sensing response to various concentrations of $CO_2$ in $N_2$, in accordance with the features of the present invention.

Subsequently, the invented system and method were tested to demonstrate analyte concentration sensing abilities. For this testing, mixtures of $CO_2$ and $N_2$, with the results shown in FIG. 10C. The $CO_2$ gas concentration was reduced from 100% to 25% in steps of 25%. The total flow was maintained at the constant 100 mL $min^{-1}$ level with increased $N_2$ flow. Experimental results indicated a linear response of the frequency shift to $CO_2$ concentration. These results also suggest the limit of detection of 1000 ppm assuming minimum detectable frequency shift of 1 KHz. This compares well with the results for gas sensor based on palladium phase transition.

Figure 10D:
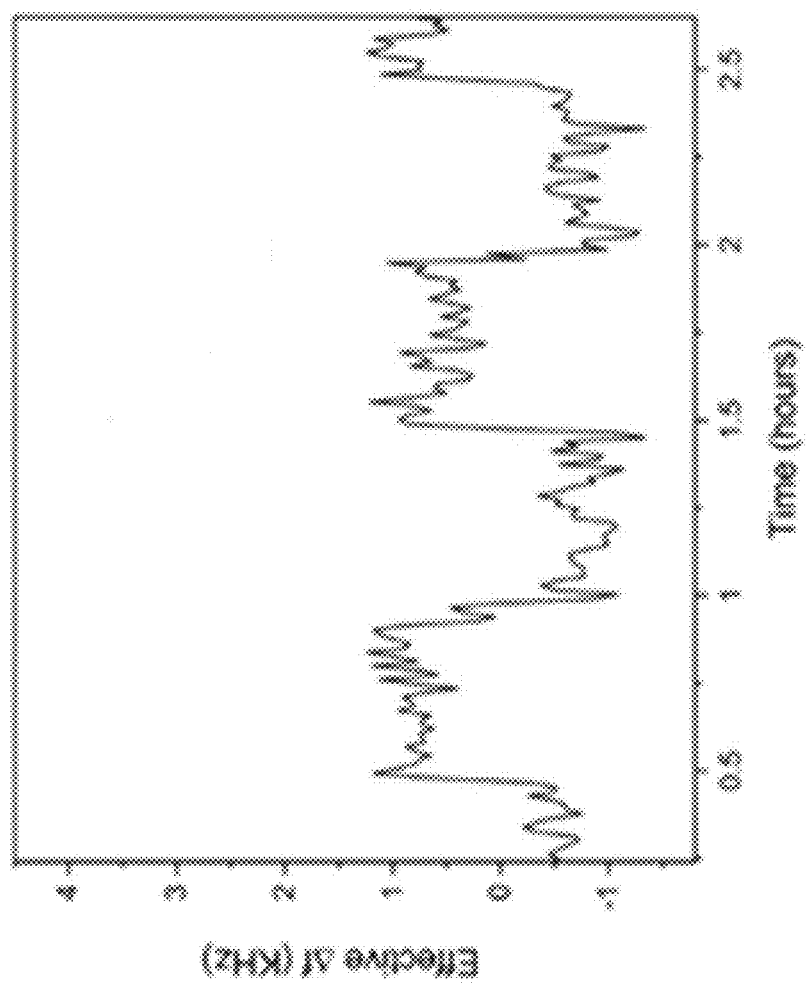
FIG. 10D shows the sensing response of a wireless spoof plasmon sensor during alternating cycles of exposure to $N_2$ and $CO_2$, in accordance with the features of the present invention.
Figure 11:
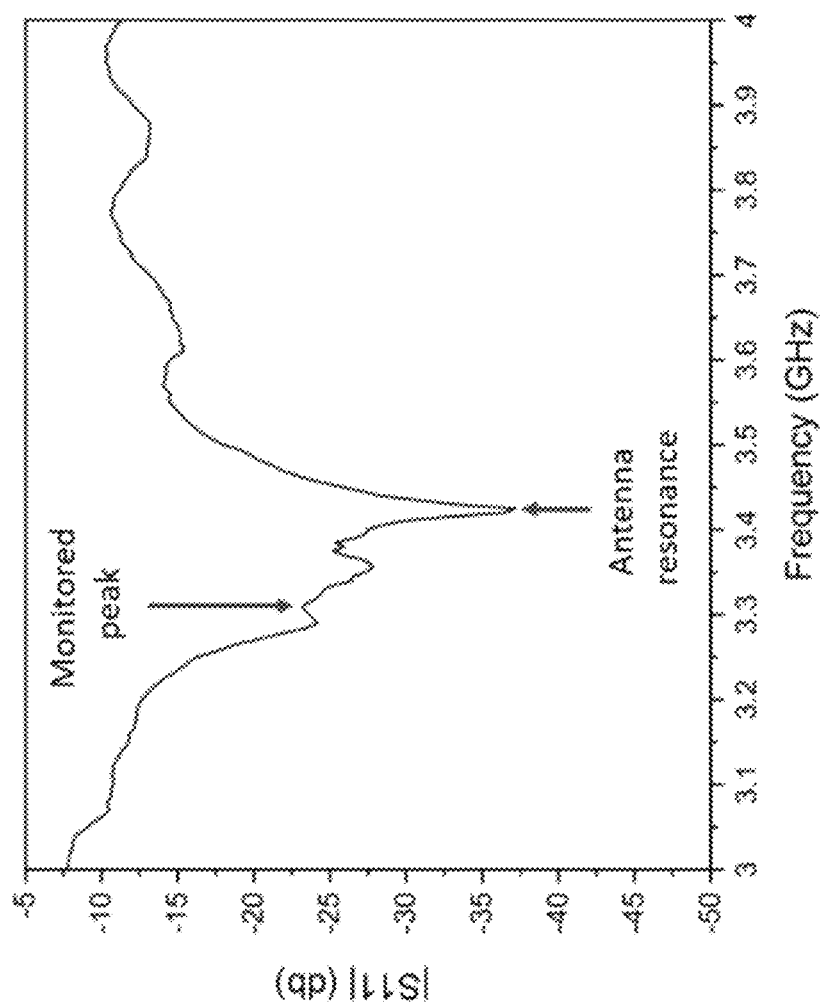
FIG. 11 is an acquired S11 spectrum for a wireless gas sensing experiment, wherein the peak corresponding to spoof plasmon sensor reflected power is shown, in accordance with the features of the present invention.

In another example, a wireless spoof plasmon sensor embodying the design in FIG. 2B was used with wireless interrogation of the passive spoof plasmon sensor using external dipole antennas on both sensor and the network analyzer (interrogator) side separated by a short distance (~5 cm). The data for this testing is shown in FIG. 10D. FIG. 10D shows a well-defined synchronous frequency shift in response to $N_2/CO_2$ cycling has been shown. This experiment used a lower frequency cavity resonance (f=3.316 GHz) and the detection method employed weighted average frequency shift of the sensor peak superimposed on the interrogator antenna S11 (reflection coefficient or reflected scattering parameter) spectrum as shown in FIG. 11. Dipole antennas were designed for f=3.4 GHz resonance. The results show promise for use of spoof plasmon phase transition substrates as wireless wearable plasmonic sensors.

The sensor was also tested with liquid analytes. In testing, the sensor exhibited fast, easily detectable response when contacted with liquid analytes such as water, ethanol and acetone.

In an embodiment, the invention provides A method to detect the presence and or concentration of an analyte in the environment of a spoof plasmon sensor comprising: providing a spoof plasmon sensor into an environment; interrogating said spoof plasmon sensor with an electromagnetic signal; collecting a modified electromagnetic signal from the spoof plasmon sensor; and analyzing the modified electromagnetic signal to detect an analyte in the environment of the sensor.

In an embodiment, the spoof plasmon sensor comprises a substrate with a superior surface, wherein a conductive material is disposed on the superior surface of the substrate, wherein said conductive material defines a waveguide, and wherein the waveguide defines spoof plasmon cavities comprising exposed substrate, and wherein said modified electromagnetic signal is generated as a result of an analyte in the environment interacting with and changing the permittivity of the substrate. In an exemplary embodiment, the analyte interacting with the substrate changes the permittivity of the substrate by causing the substrate to change phase.

In an embodiment, the electromagnetic signal has a frequency between approximately 1 GHz and approximately 100 GHz.

In an embodiment, the substrate is a metamaterial selected from the group consisting of polymers, metal organic frameworks, coordinational organic frameworks, biopolymers, biomolecules, and combinations thereof.

In an embodiment, the substrate comprises PTFE.

In an embodiment, the analyte is a gas selected from the group consisting of $CO_2$, CO, $N_2$, $H_2$, $H_2O$, $CH_4$, and combinations thereof.

In an embodiment, interrogating said spoof plasmon sensor comprises wireless transmitting said electromagnetic signal from an interrogator to said spoof plasmon sensor.

In an embodiment, the spoof plasmon sensor has a response time of less than four seconds.

In an embodiment, analyzing the modified electromagnetic signal to detect an analyte in the environment of the sensor comprises detecting the presence of an analyte in the environment of the sensor.

In an embodiment, analyzing the modified electromagnetic signal to detect an analyte in the environment of the sensor further comprises detecting the concentration of the analyte in the environment of the sensor.

In an embodiment, the concentration of the analyte is between approximately 100% and approximately 1000 ppm.

The invention also provides a spoof plasmon sensor for detecting an analyte comprising: a substrate with a superior surface; and a conductive material disposed on said superior surface, said conductive material defining a waveguide having a dual tapering shape, wherein said waveguide defines spoof plasmon cavities comprising exposed substrate, wherein said substrate is configured to change in permittivity when contacted by an analyte.

In an embodiment, the substrate is configured to change phase and permittivity when contacted by an analyte.

In an embodiment, the sensor is configured to operate with a frequency between approximately 1 GHz and approximately 100 GHz.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

Any element in a claim that does not explicitly state "means for" performing a specified function, or "step for" performing a specific function, is not to be interpreted as a "means" or "step" clause as specified in 35 U.S.C.§ 112, ¶6. In particular, the use of "step of" in the claims herein is not intended to invoke the provisions of 35 U.S.C. § 112, ¶6.

What is claimed is:

1. A method to detect the presence or concentration of an analyte in the environment of a spoof plasmon sensor comprising:
    providing a spoof plasmon sensor into an environment;
    interrogating said spoof plasmon sensor with an electromagnetic signal;
    collecting a modified electromagnetic signal from the spoof plasmon sensor; and
    analyzing the modified electromagnetic signal to detect an analyte in the environment of the sensor
    wherein the spoof plasmon sensor comprises a substrate with a superior surface, wherein a conductive material is disposed on the superior surface of the substrate, wherein said conductive material defines a waveguide, wherein the waveguide defines spoof plasmon cavities comprising exposed substrate,
    wherein said modified electromagnetic signal is generated as a result of an analyte in the environment interacting with and changing the permittivity of the substrate; and
    wherein the analyte interacting with the substrate changes the permittivity of the substrate by causing the substrate to change phase.

2. The method of claim 1 wherein the electromagnetic signal has a frequency between approximately 1 GHz and approximately 100 GHz.

3. The method of claim 1 wherein the substrate is a metamaterial selected from the group consisting of polymers, metal organic frameworks, coordinational organic frameworks, biopolymers, biomolecules, and combinations thereof.

4. The method of claim 1 wherein the substrate comprises PTFE.

5. The method of claim 1 wherein the analyte is a gas selected from the group consisting of $CO_2$, CO, $N_2$, $H_2$, $H_2O$, $CH_4$, and combinations thereof.

6. The method of claim 1 wherein interrogating said spoof plasmon sensor comprises wirelessly transmitting said electromagnetic signal from an interrogator to said spoof plasmon sensor.

7. The method of claim 1 wherein the spoof plasmon sensor has a response time of less than four seconds.

8. The method of claim 1 wherein analyzing the modified electromagnetic signal to detect an analyte in the environment of the sensor comprises detecting the presence of an analyte in the environment of the sensor.

9. The method of claim 1 wherein analyzing the modified electromagnetic signal to detect an analyte in the environment of the sensor comprises detecting the concentration of the analyte in the environment of the sensor.

10. The method of claim 9 wherein the concentration of the analyte is between approximately 100% and approximately 1000 ppm.

11. A spoof plasmon sensor for detecting an analyte comprising:
    a substrate with a superior surface; and
    a conductive material disposed on said superior surface, said conductive material defining a waveguide having a dual tapering shape, wherein said waveguide defines spoof plasmon cavities comprising exposed substrate, wherein said substrate is configured to change in permittivity when contacted by an analyte and wherein the substrate is configured to change phase and permittivity when contacted by an analyte.

12. The spoof plasmon sensor of claim 11 wherein the sensor is configured to operate with a frequency between approximately 1 GHz and approximately 100 GHz.

* * * * *